United States Patent [19]
Apelewicz

[11] Patent Number: 5,784,366
[45] Date of Patent: Jul. 21, 1998

[54] WIDEBAND CODE-DIVISION-MULTIPLE ACCESS SYSTEM AND METHOD

[75] Inventor: Tuvia Apelewicz, Ra'Anana, Israel

[73] Assignee: TransSKY Corp., Wilmington, Del.

[21] Appl. No.: 703,826

[22] Filed: Aug. 27, 1996

[51] Int. Cl.[6] .................. H04J 13/04; H04L 27/92
[52] U.S. Cl. .................. 370/342; 370/320; 370/335; 375/200; 375/326; 375/349
[58] Field of Search .................. 370/320, 335, 370/342, 491, 500; 375/200, 205, 206, 229, 235, 308, 326, 329, 349

[56] References Cited

U.S. PATENT DOCUMENTS

| | | | |
|---|---|---|---|
| 4,561,089 | 12/1985 | Rouse et al. | 370/18 |
| 4,567,588 | 1/1986 | Jerrim | 370/18 |
| 4,979,183 | 12/1990 | Cowart | 375/1 |
| 5,029,180 | 7/1991 | Cowart | 375/1 |
| 5,063,560 | 11/1991 | Verburye et al. | 370/18 |
| 5,103,459 | 4/1992 | Gilhousen et al. | 375/1 |
| 5,121,407 | 6/1992 | Partyka et al. | 375/1 |
| 5,177,766 | 1/1993 | Holland et al. | 375/1 |
| 5,218,619 | 6/1993 | Dent | 375/1 |
| 5,297,162 | 3/1994 | Lee et al. | 375/1 |
| 5,329,547 | 7/1994 | Ling | 375/1 |
| 5,345,472 | 9/1994 | Lee | 375/1 |
| 5,359,624 | 10/1994 | Lee et al. | 375/1 |
| 5,375,140 | 12/1994 | Bustamante et al. | 375/1 |
| 5,377,226 | 12/1994 | Davis | 375/1 |
| 5,383,220 | 1/1995 | Murai | 375/1 |
| 5,410,568 | 4/1995 | Schilling | 375/205 |
| 5,414,699 | 5/1995 | Lee | 370/18 |
| 5,414,728 | 5/1995 | Zehavi | 375/200 |
| 5,420,896 | 5/1995 | Schilling | 375/205 |
| 5,442,662 | 8/1995 | Fulhasawa et al. | 375/205 |
| 5,477,195 | 12/1995 | Spilker | 331/11 |
| 5,488,631 | 1/1996 | Gold et al. | 375/206 |
| 5,495,499 | 2/1996 | Fenton et al. | 375/205 |
| 5,515,396 | 5/1996 | Dalekotzin | 375/206 |
| 5,544,155 | 8/1996 | Lucas et al. | 370/18 |
| 5,550,810 | 8/1996 | Monogioudis et al. | 370/18 |
| 5,559,828 | 9/1996 | Armstrong et al. | 375/200 |
| 5,581,575 | 12/1996 | Zehavi et al. | 375/200 |
| 5,602,833 | 2/1997 | Zehavi | 370/209 |
| 5,666,352 | 9/1997 | Ohgoshi et al. | 370/206 |

*Primary Examiner*—Hassan Kizou
*Attorney, Agent, or Firm*—David Newman Chartered

[57] ABSTRACT

A wideband code division multiple access, spread-spectrum communications system, having an equalization channel. The transmitter transmits data over a spread-spectrum channel, along with a spread-spectrum channel having little or no information, i.e., an equalization channel. The receiver uses in-phases early, punctual and late signals, and quadrature-phase early, punctual and late signals, for equalizing of the data spread-spectrum channel, and for generating an output in-phase data signal and an output quadrature-phase data signal.

16 Claims, 6 Drawing Sheets

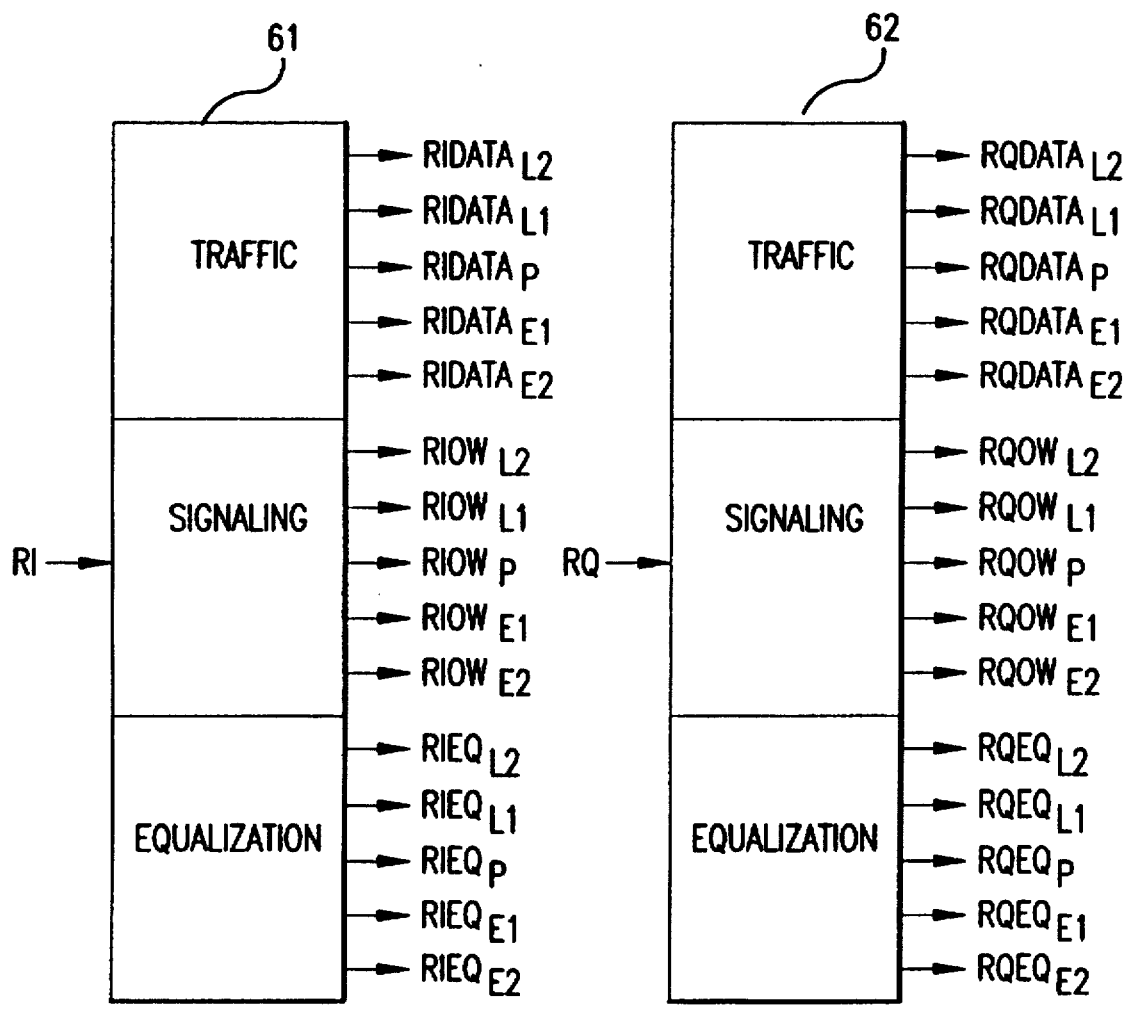
FIG.3                    FIG.4
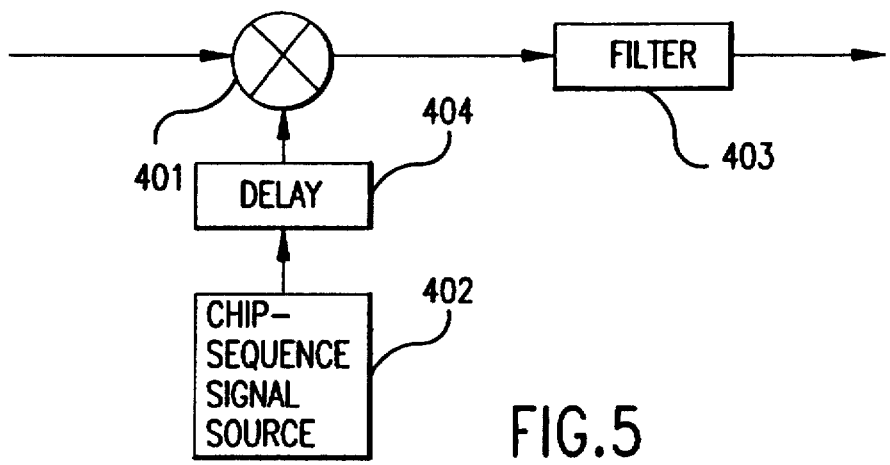
FIG.5

WIDEBAND CODE-DIVISION-MULTIPLE ACCESS SYSTEM AND METHOD

BACKGROUND OF THE INVENTION

This invention relates to spread-spectrum communications, and more particularly to a method and apparatus using an equalization channel and combining multipath spread-spectrum signals for enhancing overall system performance.

DESCRIPTION OF THE RELEVANT ART

Synchronization for a received spread-spectrum signal includes having the received spread-spectrum signal arriving at a receiver accurately timed in both its code pattern position and the chip rate, with the reference chip-sequence signal in the receiver. In a communications channel with a multipath environment, multiple versions of the received spread-spectrum signal may arrive at the receiver, within portions of a chip. The multiple arrivals of the signal can cause timing to trigger from an early, punctual or late arrival of the spread-spectrum signal at the receiver. In a time varying environment, the degradation in performance may result from detecting different multipath signals over time. Thus, a problem exists in receiving a spread-spectrum signal with time varying multipath, and not adapting the receiver to the time varying multipath.

SUMMARY OF THE INVENTION

A general object of the invention is a wideband code division multiple access system having an equalization channel for enhancing the combining of multipath spread-spectrum signals.

According to the present invention, as embodied and broadly described herein, a wideband code-division-multiple-access (W-CDMA) system is provided comprising a W-CDMA transmitter and a W-CDMA receiver. The W-CDMA transmitter includes an in-phase-data-product device, a quadrature-phase-data-product device, equalization-chip means, an in-phase combiner, a quadrature-phase combiner, a quadrature-phase-shift-keyed (QPSK) modulator, a power amplifier, and an antenna. The in-phase-data-product device multiplies an in-phase-data (IDATA) signal with a data-chip-sequence signal, to generate an IDATA-spread-spectrum signal. The quadrature-phase-data-product device multiplies a quadrature-phase-data (QDATA) signal with the data-chip-sequence signal, to generate a QDATA-spread-spectrum signal. The equalization-chip means outputs an equalization-chip-sequence signal. The in-phase combiner linearly combines the IDATA-spread-spectrum signal and the equalization-chip-sequence signal, to generate an in-phase-combined-spread-spectrum signal. The quadrature-phase combiner linearly combines the QDATA-spread-spectrum signal and the equalization-chip-sequence signal, to generate the quadrature-phase-combined-spread-spectrum signal. The QPSK modulator modulates the in-phase-combined-spread-spectrum signal with the quadrature-phase-combined-spread-spectrum signal, to generate a QPSK-spread-spectrum signal. The power amplifier amplifies the QPSK-spread-spectrum signal, and the antenna radiates the amplified QPSK-spread-spectrum signal over a communications channel.

The W-CDMA receiver includes an antenna, a QPSK demodulator, an in-phase-punctual-equalization means, first in-phase-late-equalization means, quadrature-phase-punctual-equalization means, first quadrature-phase-late-equalization means, in-phase-punctual-data means, first in-phase-late-data means, quadrature-phase-punctual-data means, first quadrature-phase-late-data means, and a processor. The antenna couples the W-CDMA receiver to the communications channel. The in-phase-punctual-equalization means despreads an in-phase component of the equalization-chip-sequence signal embedded in the received QPSK-spread-spectrum signal, and outputs the despread signal as a received-in-phase-punctual-equalization signal ($RIEQ_P$). The first in-phase-late-equalization means despreads, delayed in time by a first portion of a chip, e.g. one-half chip late, the in-phase component of the equalization-chip-sequence signal embedded in the QPSK-spread-spectrum signal, as a first received-in-phase-late-equalization signal ($RIEQ_{L1}$). The quadrature-phase-punctual-equalization means despreads a quadrature-phase component of the equalization-chip-sequence signal embedded in the QPSK-spread-spectrum signal, as a received-quadrature-phase-punctual-equalization signal ($RQEQ_P$). The first quadrature-phase-late-equalization means despreads, delayed in time by a first portion of a chip, e.g. one-half chip late, the quadrature-phase component of the equalization-chip-sequence signal embedded in the QPSK-spread-spectrum signal, as a first received-quadrature-phase-late-equalization signal ($RQEQ_{L1}$).

The in-phase-punctual-data means despreads the IDATA-spread-spectrum signal embedded in the QPSK-spread-spectrum signal as a received-in-phase-punctual-data signal ($RIDATA_P$). The first in-phase-late-data means despreads, delayed in time by a first portion of a chip, e.g. one-half chip late, the IDATA-spread-spectrum signal embedded in the QPSK-spread-spectrum signal, as a first received-in-phase-late-data signal ($RIDATA_{L1}$). The quadrature-phase-punctual-data means despreads the QDATA-spread-spectrum signal embedded in the QPSK-spread-spectrum signal as a received-quadrature-phase-punctual-data signal ($RQDATA_P$). The first quadrature-phase-late-data means despreads, delayed in time by a first portion of a chip, e.g. one-half chip late, the QDATA-spread-spectrum signal embedded in the QPSK-spread-spectrum signal, as a first received-quadrature-phase-late-data signal ($RQDATA_{L1}$).

The processor determines an output-in-phase-data signal ($IDATA_O$) and an output-quadrature-phase-data signal ($QDATA_O$) from the received-in-phase-punctual-equalization signal, the received-quadrature-phase-punctual-equalization signal, the first received-in-phase-late-equalization signal, the first received-quadrature-phase-late-equalization signal, the received-in-phase-punctual-data signal, the received-quadrature-phase-punctual-data signal, the first received-in-phase-late-data signal, and the first received-quadrature-phase-late-data signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention, wherein like reference numbers indicate like elements in the several views.

FIG. 3 is a block diagram of in-phase despreaders;

FIG. 4 is a block diagram of quadrature-phase despreaders;

FIG. 5 shows a product device coupled to a chip-sequence generator;

DETAILED DESCRIPTION OF THE PREFERRED EMBODIMENTS

Figure 1:
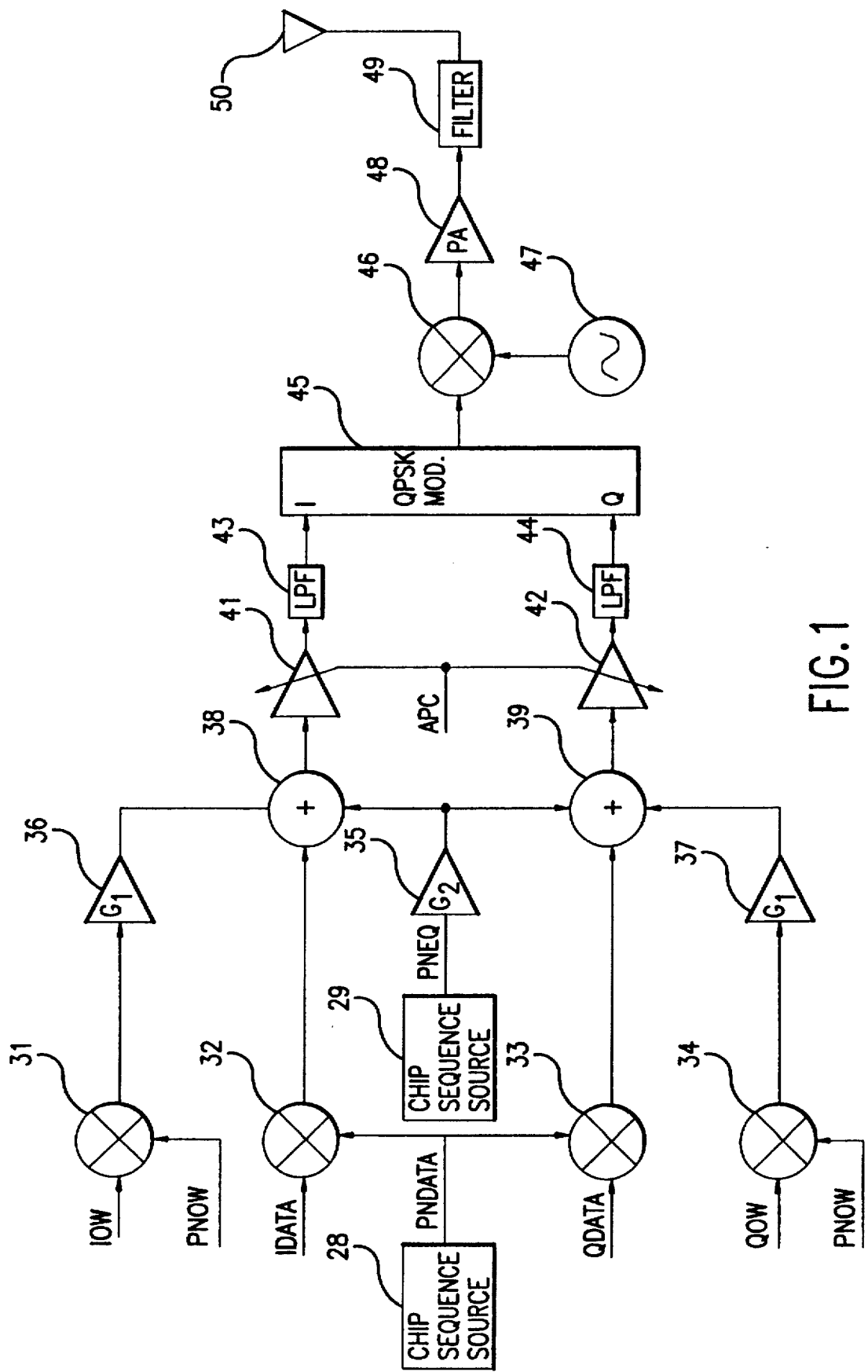
FIG. 1 is a block diagram of a spread-spectrum transmitter with an equalization channel.

Reference now is made in detail to the present preferred embodiments of the invention, examples of which are illustrated in the accompanying drawings.

The present invention provides a wideband code-division-multiple-access (W-CDMA) system for use in a multipath environment. The W-CDMA system includes one or more W-CDMA transmitters and one or more W-CDMA receivers. The following discussion focuses on a W-CDMA transmitter and a W-CDMA receiver, with the understanding that multiple W-CDMA transmitters and W-CDMA receivers can be used in a system.

W-CDMA Transmitter

The W-CDMA transmitter includes an in-phase-data-product device 32, a quadrature-phase-data-product device 33, data-chip means, equalization-chip means, an in-phase combiner 38, a quadrature-phase combiner 39, a quadrature-phase-shift-keyed (QPSK) modulator 45, a multiplying device 46 and an oscillator 47, a power amplifier 48, a filter 49, and a transmitter antenna 50. The in-phase combiner 38 is coupled to the in-phase-data-product device 32 and to the equalization-chip means. The quadrature-phase combiner 39 is coupled to the quadrature-phase-data-product device 33 and to the equalization-chip means. The QPSK modulator 45 is coupled to the in-phase combiner 38 and to the quadrature-phase combiner 39. The product device 46 is coupled to the oscillator 47, and between the QPSK modulator 45 and the power amplifier 48. The transmitter antenna 50 is coupled through the filter 49 to the power amplifier 48.

The in-phase-data-product device 32 multiplies an in-phase-data (IDATA) signal with a data-chip-sequence signal. This multiplication generates an IDATA-spread-spectrum signal. The quadrature-phase-data-product device 33 multiplies a quadrature-phase-data (QDATA) signal with the data-chip-sequence signal. This multiplication generates a QDATA-spread-spectrum signal. The IDATA signal and the QDATA signal may be generated as part of the W-CDMA transmitter or as an input circuit to the W-CDMA transmitter. The IDATA signal and a QDATA signal are from data sources. Prefixes, such as "IDATA" and "QDATA", are used to denote the source of a signal or channel to which the signal is connected.

The equalization-chip means outputs an equalization-chip-sequence signal. The equalization-chip means, as shown in FIG. 1, includes a chip-sequence source 29 for an equalization-chip-sequence signal, such as an equalization-chip-sequence generator for generating the equalization-chip-sequence signal. The equalization-chip-sequence generator may include shift registers with appropriate taps, as is well known in the art, for generating the particular chip-sequence signal. The equalization-chip-sequence generator alternatively may be embodied as, or as part of, a digital signal processor (DSP) or application specific integrated circuit (ASIC). Construction of DSPs and ASICs, and their use, are well known in the art. The equalization-chip means alternatively may include, as a chip-sequence source 29 for an equalization-chip-sequence signal, a memory for storing the equalization-chip-sequence signal, and outputting the equalization-chip-sequence signal. The memory may be constructed from discrete components, or as part of a DSP or ASIC.

The data-chip means is a chip-sequence source 28 for a data-chip-sequence signal, and may be embodied as a data-chip-sequence generator or as a memory. The data-chip-sequence generator generates the data-chip-sequence signal. The data-chip-sequence generator may include shift registers with appropriate taps, as is well known in the art, for generating a particular data-chip-sequence signal. The data-chip-sequence generator alternatively may be built into a DSP or ASIC. The data-chip means alternatively may include, as a chip-sequence source 28 for outputting the data-chip-sequence signal, a memory for storing the data-chip-sequence signal, and outputting the data-chip-sequence signal.

The present invention may have more than one data channel, or an orderwire/signalling data channel. The presence of a second data channel, such as the IOW and QOW channels, however, is optional. As shown in FIG. 1, an orderwire signal having an in-phase component (IOW) and a quadrature-phase component (QOW), is multiplied, using an in-phase-orderwire-product device 31 and a quadrature-phase-orderwire-product device 34, by an orderwire-chip-sequence signal, to generate an in-phase-orderwire-spread-spectrum signal (IOW-spread-spectrum signal) and a quadrature-phase-spread-spectrum signal (QOW-spread-spectrum signal), respectively.

The amplifiers 36, 37, having a gain $G_1$, can be used to adjust the amplitude of the IOW-spread-spectrum signal and the QOW-spread-spectrum signal, to a level less than that of the IDATA-spread-spectrum signal and the QDATA-spread-spectrum signal. The amplifier 35, having gain $G_2$, can adjust the amplitude of the equalization-chip-sequence signal. The gain of amplifiers 35, 36, 37 may be adjusted to having the same amplitude, or the equalization-chip-sequence signal may have an amplitude less than that of the IOW-spread-spectrum signal and the QOW-spread-spectrum signal. Since the equalization-chip-sequence signal carries very little information or no information, and preferably is a channel absent of information, in terms of processing gain, less amplitude may be used in this channel.

The in-phase combiner 38 linearly combines the IOW-spread-spectrum signal, the IDATA-spread-spectrum signal and the equalization-chip-sequence signal, to generate an in-phase-combined-spread-spectrum signal. The quadrature-phase combiner 39 linearly combines the QOW-spread-spectrum signal, the QDATA-spread-spectrum signal and the equalization-chip-sequence signal to generate the quadrature-phase-combined-spread-spectrum signal. The in-phase combiner 38 and the quadrature-phase combiner 39, while linear, may have nonlinearities, with degradation in performance.

An adaptive power control circuit 41 includes an in-phase-variable amplifier 41 and a quadrature-phase-variable amplifier 42, which are coupled, respectively, to the outputs of the in-phase combiner 38 and the quadrature-phase combiner 39. An adaptive power control (APC) signal controls the variable gains of the in-phase-variable amplifier 41 and the quadrature-phase-variable amplifier 42. The filter 43 filters the output of the in-phase-variable amplifier 41. The filter 44 filters the output of the quadrature-phase-variable amplifier 42.

The QPSK modulator 45 QPSK modulates, using QPSK modulation, the in-phase-combined-spread-spectrum signal with the quadrature-phase-combined-spread-spectrum signal. The output of the QPSK modulator 45 is a QPSK-spread-spectrum signal.

The product device 46, using a carrier signal from oscillator 47, shifts the frequency of the QPSK-spread-spectrum signal to a desired carrier frequency. The power amplifier 48 amplifies the QPSK-spread-spectrum signal at the carrier frequency, and the filter 49 filters the amplified QPSK-spread-spectrum signal. The output of the filter 49 is radiated by the transmitter antenna 50, which sends the QPSK-spread-spectrum signal over a communications channel.

W-CDMA Receiver

Figure 2:
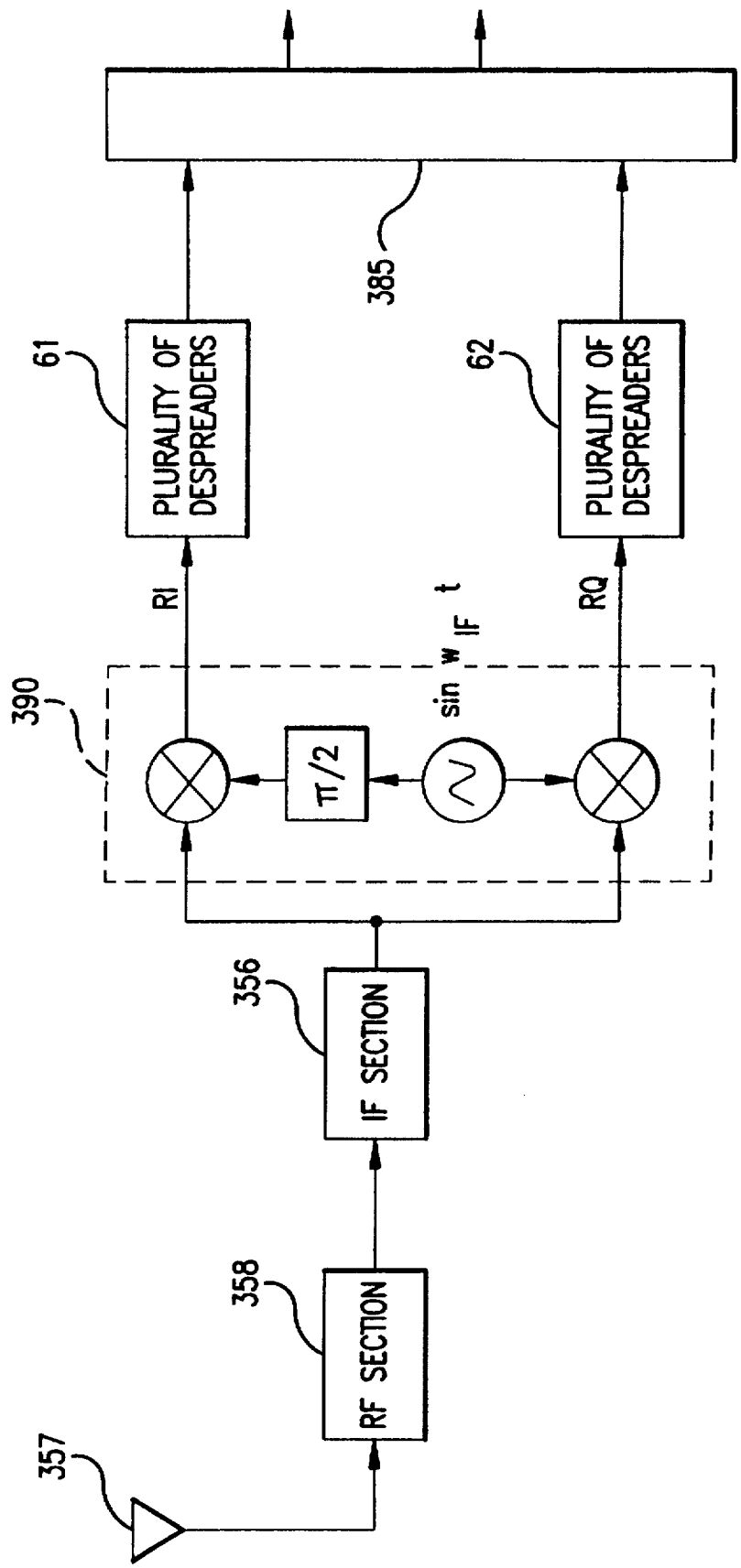
FIG. 2 is a block diagram of a frontend of a receiver.

The W-CDMA receiver, as shown in FIGS. 2, 3 and 4, includes a receiver antenna 357, a radio frequency (RF) circuit 358, an intermediate frequency (IF) section 356, and a QPSK demodulator 390. The W-CDMA receiver has an in-phase subsystem 61 of FIG. 3 and a quadrature-phase subsystem 62 of FIG. 4. The in-phase subsystem 61 includes an in-phase-punctual-equalization (IPE) means, first in-phase-late-equalization (ILE) means, in-phase-punctual-data (IPD) means, and first in-phase-late-data (ILD) means. The quadrature-phase subsystem 62 includes quadrature-phase-punctual-equalization (QPE) means, first quadrature-phase-late-equalization (QLE) means, quadrature-phase-punctual-data (QPD) means, and first quadrature-phase-late-data (QLD) means. The W-CDMA receiver also has a processors 385.

The IPE means, the first ILE means, the QPE means, the first QLE means, the IPD means, the first ILD means, the QPD means, and the first QLD means are coupled through the RF/IF circuits 358, 356, 390 to the receiver antenna 357. Processor 385 is coupled to the IPE means, the first ILE means, the QPE means, the first QLE means, IPD means, the first ILD means, the QPD means and the first QLD means.

The IPE means, first ILE means, IPD means, first ILD means, QPE means, first QLE means, QPD means, and first QLD means, as shown in FIG. 5, may each be embodied as a product device 401, chip-sequence source 402 and filter 403. The product device 401 is coupled between the chip-sequence source 402 and filter 403.

A delay device 404 may be coupled between the chip-sequence source 402 and the product device 401. A delay/advance function alternatively may be an integral part of the chip-sequence source 402, for delaying advancing the chip-sequence signal. The delay device 404 or the delay/advance function serves to delay, or advance, one chip-sequence signal relative to another. A plurality of delay devices may be connected at the output of chip-sequence source, for generating a chip-sequence signal having a plurality of delays, respectively. Circuits for delaying and advancing chip-sequence signals are well known in the art.

The chip-sequence source 402 may be embodied as a chip-sequence generator, or alternatively may be a memory for storing and outputting a replica of the chip-sequence signal. Each chip-sequence source 402, using a delay device or delay/advance function, is capable of delaying one or more replicas of one of the chip-sequence signals used by the W-CDMA transmitter, by a portion of a chip, or more. For the in-phase subsystem 61, each product device 401 for IPE means, first ILE means, IPD means and first ILD means is coupled to the in-phase portion of the RF, IF or baseband circuitry. For the quadrature-phase subsystem 62, each product device 401 for QPE means, first QLE means, QPD means and first ILD means is coupled to the quadrature-phase portion of the RF, IF or baseband circuitry.

The chip-sequence generator for the IPE means, QPE means, first ILE means and first QLE means outputs a replica of the equalization-chip-sequence signal, as used at the W-CDMA transmitter. The chip-sequence generator for generating a replica of the equalization-chip-sequence signal may be common to the IPE means, first ILE means, QPE means, and first QLE means. The replica of the equalization-chip-sequence signal for the first ILE means and first QLE means is delayed a first portion of a chip, e.g., one half chip, with respect to the replica of the equalization-chip-sequence signal for the IPE means and QPE means.

The chip-sequence generator for the IPD means, first ILD means, QPD means and first ILD means outputs a replica of the data-chip-sequence signal as used at the W-CDMA transmitter. The chip-sequence generator for generating a replica of the data-chip-sequence signal may be common to the IPD means, first ILD means, QPD means and first ILD means. The replica of the data-chip-sequence signal for the first ILD means and first QLD means is delayed a first portion of a chip, e.g., one half chip, with respect to the replica of the data-chip-sequence signal for the IPD means and QPD means.

A received spread-spectrum signal may be processed, as set forth below, at RF, IF or baseband. The RF, IF and/or baseband circuits can be made from discrete components, integrated components, part of a digital signal processor (DSP) or application specific integrated circuit (ASIC). The construction of RF, IF and/or baseband circuitry are well known in the art, and are not part of the improvement of this invention. The teachings of the invention may be implemented at RF, IF or baseband, as a design choice.

The IPE means despreads an in-phase-component of the equalization-chip-sequence signal embedded in the received, QPSK-spread-spectrum signal. The IPE means may include a chip-sequence generator for generating, or a memory for outputting, a replica of the equalization-chip-sequence signal as used at the W-CDMA transmitter. The chip-sequence generator is set to have a delay of zero, i.e., no delay, relative to a particular path (or ray) of a multipath signal being received. The output of the IPE means is a received-in-phase-punctual-equalization signal (RIEQ$_P$).

The first ILE means despreads, a first portion of a chip late, i.e., delayed in time by a first portion of a chip, the in-phase-component of the equalization-chip-sequence signal embedded in the received, QPSK-spread-spectrum signal. In a preferred embodiment, the first portion of a chip is a half of a chip. For the first in-phase-late-equalization means, the chip-sequence generator, or timing for outputting the replica of the equalization-chip-sequence signal from a memory, is set to have a delay of the first portion of the chip, relative to the chip-sequence generator of the in-phase-punctual-equalization means. At the output of the first ILE means is a first received-in-phase-late-equalization signal (RIEQ$_{L1}$).

The QPE means despreads a quadrature-phase-component of the equalization-chip-sequence signal embedded in the received, QPSK-spread-spectrum signal. For the quadrature-phase-punctual-equalization means, the chip-sequence generator, or timing for outputting the replica of the equalization-chip-sequence signal, is set to have a delay of zero, relative to the particular multipath signal. At the output of the QPE means is a received-quadrature-phase-punctual-equalization signal ($RQEQ_P$).

The first QLE means despreads, a first portion of a chip late, i.e., delayed in time by a first portion of a chip, the quadrature-phase-component of the equalization-chip-sequence signal embedded in the received, QPSK-spread-spectrum signal. For the first QLE means, the chip-sequence generator is set to have a delay of the first portion of the chip, relative to the chip-sequence generator for the quadrature-phase-punctual-equalization means. At the output of the first QLE means is a first received-quadrature-phase-late-equalization signal ($RQEQ_{L1}$).

The IPD means despreads the IDATA-spread-spectrum signal embedded in the received, QPSK-spread-spectrum signal. At the output of the IPD means is a received-in-phase-punctual-data signal ($RIDATA_P$). The QPD means despreads the QDATA-spread-spectrum signal embedded in the received, QPSK-spread-spectrum signal. At the output of the QPD means is a received-quadrature-phase-punctual-data signal ($RQDATA_P$). For each of the IPD means and the QPD means, the timing for the chip-sequence generator, or timing for outputting from a memory, a replica of the data-chip-sequence signal, is set to have a delay of zero, i.e., the same delay for the IPE means and the QPE means.

The first ILD means despreads, a first portion of a chip late, the IDATA-spread-spectrum signal embedded in the received, QPSK-spread-spectrum signal. At the output of the first ILD means is a first received-in-phase-late-data signal ($RIDATA_{L1}$). The first QLD means despreads, a first portion of a chip late, the QDATA-spread-spectrum signal embedded in the received, QPSK-spread-spectrum signal. At the output of the first QLD means is a first received-quadrature-phase-late-data signal ($RQDATA_{L1}$). For each of the first ILD means and first QLD means, the timing of the chip-signal generator, or timing for outputting from a memory a replica of the data-chip-sequence signal, is set to have a delay of a first portion of a chip, e.g., one half chip delay.

The processor 385 determines a first punctual-equalization signal ($EQ1_P$) from adding the received-in-phase-punctual-equalization signal ($RIEQ_P$) to the received-quadrature-phase-punctual-equalization signal ($RQEQ_P$), and determines a second punctual-equalization signal ($EQ2_P$) from subtracting from the received-quadrature-phase-punctual-equalization signal ($RQEQ_P$), the received-in-phase-punctual-equalization signal ($RIEQ_P$). The processor 385 determines a first late-equalization signal ($EQ1_L$) from adding the first received-in-phase-late-equalization signal ($RIEQ_{L1}$) to the first received-quadrature-phase-late-equalization signal ($RQEQ_{L1}$), and determines a second late-equalization signal ($EQ^2L$) by subtracting the first received-in-phase-late-equalization signal ($RIEQ_{L1}$) from the first received-quadrature-phase-late-equalization signal ($RQEQ_{L1}$).

The processor 385 determines an in-phase-punctual-data signal ($IDATA_P$) from multiplying the received-in-phase-punctual-data signal ($RIDATA_P$) times the first punctual-equalization signal ($EQ1_P$), and adding the multiplication of the received-quadrature-phase-punctual-data signal ($RQDATA_P$) times the second punctual-equalization signal ($EQ2_P$). The processor 385 determines a quadrature-phase-punctual-data signal ($QDATA_P$) from multiplying the received-quadrature-phase-punctual-data signal ($RQDATA_P$) times the first punctual-equalization signal ($EQ1_P$), minus the received-in-phase-punctual-data signal ($RIDATA_P$) times the second punctual-equalization signal ($EQ2_P$). The processor 385 determines a first in-phase-late-data signal ($IDATA_{L1}$) from the first received-in-phase-late-data signal ($RIDATA_{L1}$) times the first late-equalization signal ($EQ1_L$), plus the first received-quadrature-phase-late-data signal ($RQDATA_{L1}$) times the second late-equalization signal ($EQ2_L$). The processor 385 determines a first quadrature-phase-late-data signal ($QDATA_{L1}$) from the first received-quadrature-phase-late-data signal ($RQDATA_{L1}$) times the first late-equalization signal ($EQ1_L$), minus the first received-in-phase-late-data signal ($RIDATA_{L1}$) times the second late-equalization signal ($EQ2_L$). The processor 385 determines an output-in-phase-data signal ($IDATA_O$) from $IDATA_O = IDATA_{L1} + IDATA_P$ and determines an output-quadrature-phase-data signal ($QDATA_O$) from $QDATA_O = QDATA_{L1} + QDATA_P$.

The present invention may include additional means for doing equalization. By way of example, the invention may include second ILE means, second QLE means, second ILD means, and second QLD means. The second ILE means, the second QLE means, the second ILD means, and the second QLD means are coupled between the receiver antenna 357 through RF/IF circuits 358, 356, QPSK demodulator 390, and the processor 385.

The second ILE means, second ILD means, second QLE means, and second QLD means, as shown in FIG. 5, may each be embodied as a product device 401, chip-sequence generator 402 and filter 403. The product device 401 is coupled between the chip-sequence source 402, filter 403. The chip-sequence source 402 may be embodied as a chip-sequence generator, or alternatively may be a memory for storing and outputting a replica of the chip-sequence signal.

A delay device 404 may be coupled between the chip-sequence source 402 and the product device 401. A delay/advance function alternatively may be an integral part of the chip-sequence source 402, for delaying the chip-sequence signal. The delay device 404 or the delay/advance function serves to delay, or advance, one chip-sequence signal relative to another. A plurality of delay devices may be connected at the output of chip-sequence source, for generating a chip-sequence signal having a plurality of delays, respectively. Circuits for delaying chip-sequence signals are well known in the art.

Each chip-sequence source 402 is capable of delaying a replica of one of the chip-sequence signals used by the W-CDMA transmitter, by a second portion of a chip. The second portion of a chip may be less than, equal to, or greater than the time duration of a chip. For the in-phase subsystem 61, each product device 401, for second ILE means and second ILD means, is coupled to the in-phase portion of the RF, IF or baseband circuitry. For the quadrature-phase subsystem 62, each product device 401 for the second QLE means, and second ILD means is coupled to the quadrature-phase portion of the RF, IF or baseband circuitry.

The chip-sequence generator for the second ILE means and second QLE means outputs a replica of the equalization-chip-sequence signal, as used at the W-CDMA transmitter. The chip-sequence generator for generating a replica of the equalization-chip-sequence signal may be common to the IPE means, QPE means, first ILE means, first QLE means, second ILE means and second QLE means. The replica of the equalization-chip-sequence signal for the second ILE means and second QLE means is delayed a second portion of a chip, e.g., one chip, with respect to the replica of the equalization-chip-sequence signal for the IPE means and QPE means.

The chip-sequence generator for the second ILD means and second ILD means outputs a replica of the data-chip-sequence signal as used at the W-CDMA transmitter. The chip-sequence generator for generating a replica of the data-chip-sequence signal may be common to the first ILD means, first QLD means, second ILD means, and second QLD means. The replica of the data-chip-sequence signal for the second ILD means and second QLD means is delayed a second portion of a chip, e.g., one chip, with respect to the replica of the data-chip-sequence signal for the IPD means and QPD means.

The second ILE means despreads a second portion of a chip late, i.e., delayed in time by a second portion of a chip, the in-phase-component of the equalization-chip-sequence signal embedded in the received, QPSK-spread-spectrum signal. In a preferred embodiment, the second portion of a chip is equal to the time duration of a full chip. At the output of the second ILE means is a second received-in-phase-late-equalization signal ($RIEQ_{L2}$).

The second QLE means despreads a second portion of a chip late, i.e., delayed in time by a second portion of a chip, the quadrature-phase-component of the equalization-chip-sequence signal embedded in the received, QPSK-spread-spectrum signal. At the output of the second QLE means is a second received-quadrature-phase-late-equalization signal ($RQEQ_{L2}$).

The second ILD means despreads a second portion of a chip late, i.e., delayed in time by a second portion of a chip, the IDATA-spread-spectrum signal embedded in the received, QPSK-spread-spectrum signal. At the output of the second ILD means is a second received-in-phase-late-data signal ($RIDATA_{L2}$).

The second QLD means despreads, a second portion of a chip late, i.e., delayed in time by a second portion of a chip, the QDATA-spread-spectrum signal embedded in the received, QPSK-spread-spectrum signal. At the output of the second QLD means is a second received-quadrature-phase-late-data signal ($RQDATA_{L2}$).

For these added elements, the processor 385 further determines a third late-equalization signal ($EQ3_L$) from the second received-in-phase-late-equalization signal ($RIEQ_{L2}$) plus the second received-quadrature-phase-late-equalization signal ($RQEQ_{L2}$), and determines a fourth late-equalization signal ($EQ4_L$) from the second received-quadrature-phase-late-equalization signal ($RQEQ_{L2}$) minus the second received-in-phase-late-equalization signal ($RIEQ_{L2}$). The processor 385 determines a second in-phase-late-data signal ($IDATA_{L2}$) from the second received-in-phase-late-data signal ($RIDATA_{L2}$) times the third late-equalization signal ($EQ3_L$), plus the second received-quadrature-phase-late-data signal ($RQDATA_{L2}$) times the fourth late-equalization signal ($EQ4_L$). The processor 385 determines a second quadrature-phase-late-data signal ($QDATA_{L2}$) from the second received-quadrature-phase-late-data signal ($RQDATA_{L2}$) times the third late-equalization signal ($EQ3_L$) minus the second received-in-phase-late-data signal ($RIDATA_{L2}$) times the fourth late-equalization signal ($EQ4_L$). The processor 385 determines an output-in-phase-data signal ($IDATA_O$) from $IDATA_O = IDATA_{L2} + IDATA_{L1} + IDATA_P$ and determines an output quadrature-phase-data signal ($QDATA_O$) from $QDATA_O = QDATA_{L2} + QDATA_{L1} + QDATA_P$.

In addition to equalizing on late signals, the present invention also may equalize on signals which are considered early with respect to the punctual signal. In this case, the W-CDMA receiver further includes first in-phase-early-equalization (IEE) means, first quadrature-phase-early-equalization (QEE) means, first in-phase-early-data (IED) means, and first quadrature-phase-early-data (QED) means. The first IEE means, the first QEE means, the first IED means, and the first QED means are coupled between the receiver antenna 357 through RF circuit 358 and/or IF circuit 356, QPSK demodulator 390, and the processor 385.

The first IEE means, first IED means, first QEE means, and first QED means, as shown in FIG. 5, may each be embodied as a product device 401, chip-sequence generator 402 and filter 403. The product device 401 is coupled between the chip-sequence source 402, filter 403. The chip-sequence source 402 may be embodied as a chip-sequence generator, or alternatively may be a memory for storing and outputting a replica of the chip-sequence signal.

A delay device 404 may be coupled between the chip-sequence source 402 and the product device 401. A delay/advance function alternatively may be an integral part of the chip-sequence source 402, for delaying the chip sequence signal. The delay device 404 or the delay/advance function serves to delay, or advance, one chip-sequence signal relative to another. A plurality of delay devices may be connected at the output of chip-sequence source, for generating a chip-sequence signal having a plurality of delays, respectively. Circuits for delaying chip-sequence signals are well known in the art.

Each chip-sequence source 402 is capable of delaying, or advancing, a replica of one of the chip-sequence signals used by the W-CDMA transmitter, by a first portion of a chip. The first portion of a chip is typically less than the time duration of a chip. For the in-phase subsystem 61, each product device 401 for first IEE means, and first IED means is coupled to the in-phase portion of the RF, IF or baseband circuitry. For the quadrature-phase subsystem 62, each product device 401 for first QEE means, and first IED means is coupled to the quadrature-phase portion of the RF, IF or baseband circuitry.

The chip-sequence generator for the first IEE means and first QEE means outputs a replica of the equalization-chip-sequence signal, as used at the W-CDMA transmitter. The chip-sequence generator for generating a replica of the equalization-chip-sequence signal may be common to the IPE means, QPE means, first ILE means, first QLE means, second ILE means, second QLE means, first IEE means and first QEE means. The replica of the equalization-chip-sequence signal for the first IEE means and first QEE means is advanced a first portion of a chip, e.g., one half chip, with respect to the replica of the equalization-chip-sequence signal for the IPE means and QPE means.

The chip-sequence generator for the first IED means and first QED means outputs a replica of the data-chip-sequence signal as used at the W-CDMA transmitter. The chip-sequence generator for generating a replica of the data-chip-sequence signal may be common to the first IED means, first QED means, first ILD means, first QLD means, second ILD means and second QLD means. The replica of the data-chip-sequence signal for the first IED means and first QED means are advanced a first portion of a chip, e.g., one half chip, with respect to the replica of the data-chip-sequence signal for the IPD means and QPD means.

The first IEE means despreads, a first portion of a chip early, i.e., advanced in time by a first portion of a chip, the in-phase-component of the equalization-chip-sequence signal embedded in the received, QPSK-spread-spectrum signal. At the output of the first IEE means is a first received-in-phase-early-equalization signal ($RIEQ_{E1}$).

The first QEE means despreads, a first portion of a chip early, i.e., advanced in time by a first portion of a chip, the quadrature-phase-component of the equalization-chip-sequence signal embedded in the received, QPSK-spread-spectrum signal. At the output of the first quadrature-phase-early-equalization means is a first received-quadrature-phase-early-equalization signal ($RQEQ_{E1}$).

The first IED means despreads, a first portion of a chip early, i.e., advanced in time by a first portion of a chip, the IDATA-spread-spectrum signal embedded in the received, QPSK-spread-spectrum signal. At the output of the first IED means is a first received-in-phase-early-data signal ($RIDATA_{E1}$).

The first QED means despreads, a first portion of a chip early, i.e., advanced in time by a first portion of a chip, the QDATA-spread-spectrum signal embedded in the received, QPSK-spread-spectrum signal. At the output of the first QED means is a first received-quadrature-phase-early-data signal ($RQDATA_{E1}$).

For the detection of an early chip, the processor 385 determines a first early-equalization signal ($EQ1_E$) from the first received-in-phase-early-equalization signal ($RIEQ_{E1}$) plus the first received-quadrature-phase-early equalization signal ($RQEQ_{E1}$), and determines a second early-equalization signal ($EQ^2E$) from the first received-quadrature-phase-early-equalization signal ($RQEQ_{E1}$) minus the first received-in-phase-early-equalization signal ($RIEQ_{E1}$). The processor 385 determines a first in-phase-early-data signal ($IDATA_{E1}$) from the first received-in-phase-early-data signal ($RIDATA_{E1}$) times the first early-equalization signal $EQ1_E$), plus the first received-quadrature-phase-early-data signal ($RQDATA_{E1}$) times the second early-equalization signal ($EQ2_E$). The processor 385 determines a first quadrature-phase-early-data signal ($QDATA_{E1}$) from the first received-quadrature-phase-early-data signal ($RQDATA_{E1}$) times the first early-equalization signal $EQ1_E$), minus the first received-in-phase-early-data signal ($RIDATA_{E1}$) times the second early-equalization signal ($EQ2_E$). The processor 385 determines an output-in-phase-data signal ($IDATA_O$) from $IDATA_O=IDATA_{L1}+IDATA_{L2}+IDATA_P+IDATA_{E1}$ and determines an output quadrature-phase-data signal ($QDATA_O$) from $QDATA_O=QDATA_{L1}+QDATA_{L2}+QDATA_P+QDATA_{E1}$.

In a similar fashion to the late equalization, the W-CDMA receiver may include detecting a received QPSK-spread-spectrum signal a second portion of a chip early relative to the punctual signal. In a preferred embodiment, the second portion of a chip is an advance in time of one chip. In this case, the W-CDMA receiver further includes second IEE means, second QEE means, second IED means, and second QED means. The second IEE means, the second QEE means, the second IED means, and the second QED means is coupled between the antenna 357 through RF circuit 358 and/or IF circuits 356, QPSK demodulator 390, and the processor 385.

The second IEE means, second IED means, second QEE means, and second QED means, as shown in FIG. 5, may each be embodied as a product device 401, chip-sequence generator 402 and filter 403. The product device 401 is coupled between the chip-sequence source 402, filter 403. The chip-sequence source 402 may be embodied as a chip-sequence generator, or alternatively may be a memory for storing and outputting a replica of the chip-sequence signal.

A delay device 404 may be coupled between the chip-sequence source 402 and the product device 401. A delay/advance function alternatively may be an integral part of the chip-sequence source 402, for delaying/advancing the chip sequence signal. The delay device 404 or the delay/advance function serves to delay, or advance, one chip-sequence signal relative to another. A plurality of delay devices may be connected at the output of chip-sequence source, for generating a chip-sequence signal having a plurality of delays, respectively. Circuits for delaying chip-sequence signals are well known in the art.

Each chip-sequence source 402 is capable of advancing a replica of one of the chip-sequence signals used by the W-CDMA transmitter, by a second portion of a chip. The second portion of a chip can be less than, equal to, or greater than the time duration of a chip. For the in-phase subsystem 61, each product device 401 for second IEE means, and second IED means is coupled to the in-phase portion of the RF, IF or baseband circuitry. For the quadrature-phase subsystem 62, each product device 401 for second QEE means, and second IED means is coupled to the quadrature-phase portion of the RF, IF or baseband circuitry.

The chip-sequence generator for the second IEE means and second QEE means outputs a replica of the equalization-chip-sequence signal, as used at the W-CDMA transmitter. The chip-sequence generator for generating a replica of the equalization-chip-sequence signal may be common to the first IPE means, QPE means, first ILE means, first QLE means, second ILE means, second QLE means, first IEE means, first QEE means, second IEE means and second QEE means. The replica of the equalization-chip-sequence signal for the second IEE means and second QEE means is advanced a second portion of a chip, e.g., one chip, with respect to the replica of the equalization-chip-sequence signal for the IPE means and QPE means.

The chip-sequence generator for the second IED means, and second QED means outputs a replica of the data-chip-sequence signal as used at the W-CDMA transmitter. The chip-sequence generator for generating a replica of the data-chip-sequence signal may be common to the first ILD means, first QLD means, second ILD means, second QLD means, first IED means, first QED means, second IED means and second QED means. The replica of the data-chip-sequence signal for the second IED means and second QED means is advanced a second portion of a chip, e.g., one chip, with respect to the replica of the data-chip-sequence signal for the IPD means and QPD means.

The second IEE means despreads, a second portion of a chip early, i.e., advanced in time by a second portion of a chip, the in-phase-component of the equalization-chip-sequence signal embedded in the received, QPSK-spread-spectrum signal. At the output of the second IEE means is a second received-in-phase-early-equalization signal ($RIEQ_{E2}$).

The second QEE means despreads, a second portion of a chip early, i.e., advanced in time by a second portion of a chip, the quadrature-phase-component of the equalization-chip-sequence signal embedded in the received, QPSK-spread-spectrum signal. At the output of the second QEE means is a second received-quadrature-phase-early-equalization signal ($RQEQ_{E2}$).

The second IED means despreads, a second portion of a chip early, i.e., advanced in time by a second portion of a chip, the IDATA-spread-spectrum signal embedded in the received, QPSK-spread-spectrum signal. At the output of the second IED means is a second received-in-phase-early-data signal ($RIDATA_{E2}$).

The second QED means despreads, a second portion of a chip early, i.e., advanced in time by a second portion of a chip, the QDATA-spread-spectrum signal embedded in the received, QPSK-spread-spectrum signal. At the output of the second QED means is a second received-quadrature-phase-early-data signal (RQDATA$_{E2}$).

For the second early arrival ray or path of multipath, the processor 385 further determines a third early-equalization signal (EQ3$_E$) from the second received-quadrature-phase-early-equalization signal (RQEQ$_{E2}$) plus the second received-in-phase-early-equalization signal (RIEQ$_{E2}$), and determines a fourth early-equalization signal (EQ4$_E$) from the second received-quadrature-phase-early-equalization signal (RQEQ$_{E2}$) minus the second received-in-phase-early-equalization signal (RIEQ$_{E2}$). The processor 385 determines a second in-phase-early-data signal (IDATA$_{E2}$) from the second received-in-phase-early-data signal (RIDATA$_{E2}$) times the third early-equalization signal (EQ3$_E$), plus the second received-quadrature-phase-early-data signal (RQDATA$_{E2}$) times the fourth early-equalization signal (EQ4$_E$).

The processor 385 determines a second quadrature-phase-early-data signal (QDATA$_{E2}$) from the second received-quadrature-phase-early-data signal (RQDATA$_{E2}$) times the third early-equalization signal (EQ3$_E$), minus the second received-in-phase-early-data signal (RIDATA$_{E2}$) times the fourth early-equalization signal (EQ4$_E$). The processor 385 determines an output-in-phase-data signal (IDATA$_O$) from IDATA$_O$=IDATA$_{L2}$+IDATA$_{L1}$+IDATA$_P$+IDATA$_{E1}$+IDATA$_{E2}$ and determines an output quadrature-phase-data signal (QDATA$_O$) from QDATA$_O$=QDATA$_{L2}$+QDATA$_{L1}$+QDATA$_P$+QDATA$_{E1}$+QDATA$_{E2}$.

In use, the W-CDMA system may employ more than one data channel, such as used for an orderwire/signalling data. The processing section, baseband section, of the W-CDMA receiver would contain, as illustrated in FIGS. 3 and 4, three groups of complex (in-phase and quadrature-phase) despreaders: data despreaders, orderwire or signalling data despreaders, and equalization despreaders. For receiving five rays or paths of a multipath signal, each group of complex despreaders has five taps with preferably a uniform spacing of ½ chip between the taps. The taps are labeled: E2, E1, P, L1, L2. For example, the E1 tap is ½ chip earlier than the punctual tap P, and L2 is 1 chip later than P. In FIG. 3, RI is the in-phase, I, channel input and in FIG. 4, RQ is the quadrature-phase, Q, channel input.

The present invention is illustrated with upto five taps, for receiving upto five rays or paths of a multipath signal. From the teachings of the invention, a person skilled in the art can extend the implementation of the invention for more than five rays or paths of a multipath signal.

By way of illustration, and not limitation, the present invention is taught for receiving upto five rays or paths of a multipath signal, using a punctual, first late, second late, first early and second early ray. The label of these rays is arbitrary, and one skilled in the art would recognize that the five rays could have been labeled punctual, first late, second late, third late and fourth late, or punctual, first early, second early, third early and fourth early, or by some other labeling scheme, within the teaching of the invention.

The equalization-chip-sequence signal, embedded in the QPSK spread-spectrum signal, provides a good estimate of the Doppler frequency and phase, and the weight of the effective desired energy so that the multipath energy can be summed in a positive coherent way.

The punctual received RIEQ$_P$ signal and RQEQ$_P$ signal after despreading, are:

$$RIEQ_P = \tfrac{1}{2}\alpha_P\cos(\omega_D t+\theta_P)-\tfrac{1}{2}\alpha_P\sin(\omega_D t+\theta_P) \quad\quad 1$$

$$RQEQ_P = \tfrac{1}{2}\alpha_P\sin(\omega_D t+\theta_P)+\tfrac{1}{2}\alpha_P\cos(\omega_D t+\theta_P) \quad\quad 2$$

Note that $\alpha_P$ is proportional to the desired energy in the punctual ray P, $\omega_D$ is the frequency difference between the transmitter and received clocks, and $\theta_P$ is the phase difference between the transmitter equalization-chip-sequence signal and the received in-phase and quadrature-phase punctual-equalization signals in the punctual ray.

Using combiners 70, 71, define two new signals EQ1$_P$ and EQ2$_P$, respectively, where:

$$EQ1_P = RIEQ_P+RQEQ_P \quad\quad 3$$

$$EQ2_P = -RIEQ_P+RQEQ_P \quad\quad 4$$

Figure 6:
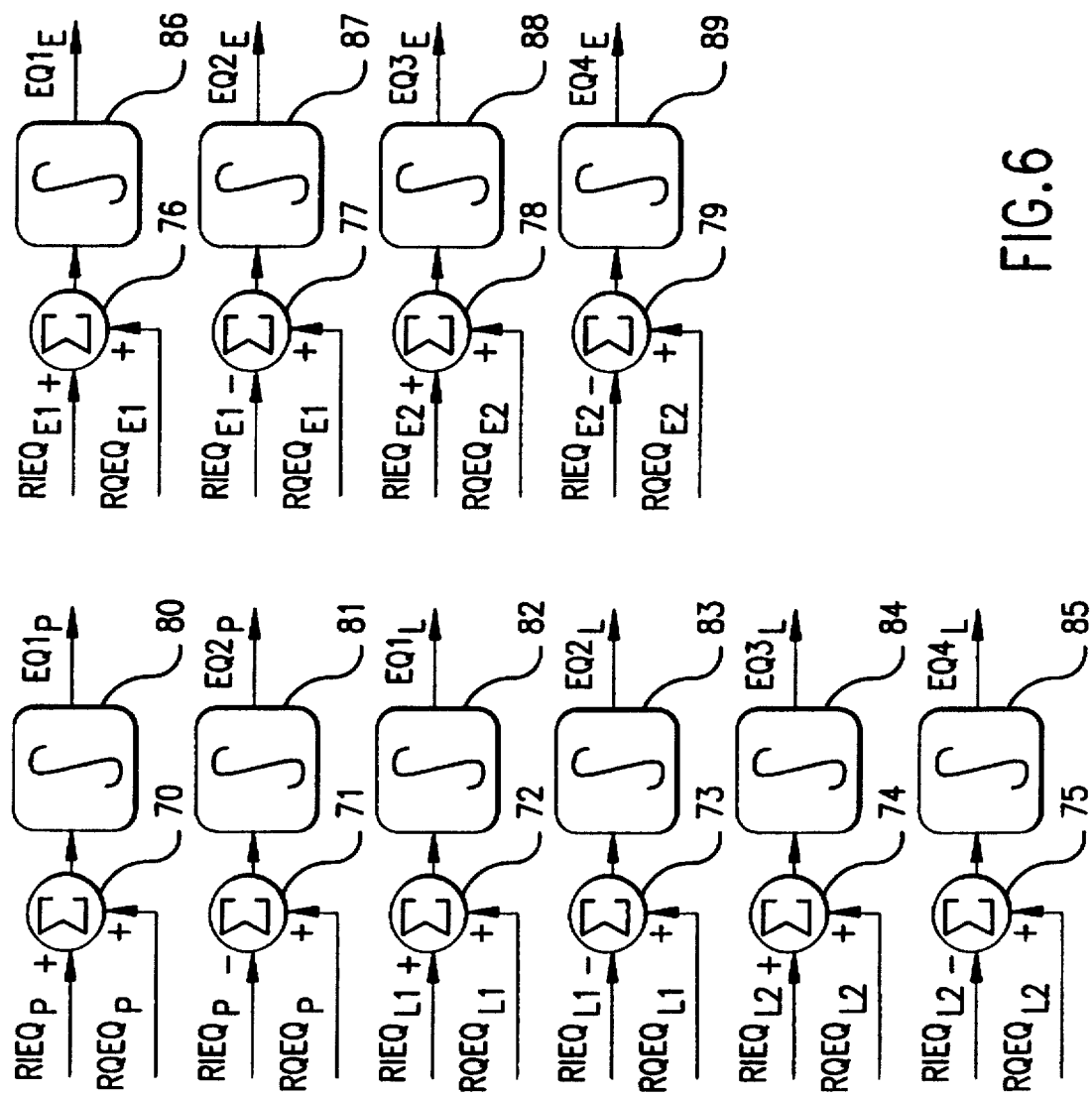
FIG. 6 is a block diagram for deriving equalization signals.

Using equations 1 and 2, gives:

$$EQ1_P = \alpha_P\cos(\omega_D t+\theta_P) \quad\quad 5$$

$$EQ2_P = \alpha_P\sin(\omega_D t+\theta_P) \quad\quad 6$$

Where $\alpha_P$ is the measure of the punctual energy. In the same way EQ1$_L$, EQ2$_L$, EQ3$_L$, EQ4$_L$, EQ1$_E$, EQ2$_E$, EQ3$_E$, EQ4$_E$, using combiners 72–79, respectively, can be found, as shown in FIG. 6. The derived signals are then integrated by integrators 80–89 to average out the associated noise.

The punctual data signal is used to demonstrate the concept of the invention. The discussion for the punctual data signal is valid for the other data signals, late and early, as well.

The received despread punctual data signals are:

$$RIDATA_P = \tfrac{1}{2}\alpha_P \cdot IDATA_P\cos(\omega_D t+\theta_P) - \tfrac{1}{2}\alpha_P \cdot QDATA_P\sin(\omega_D t+\theta_P) \quad\quad 7$$

$$RQDATA_P = \tfrac{1}{2}\alpha_P \cdot IDATA_P\sin(\omega_D t+\theta_P) + \tfrac{1}{2}\alpha_P \cdot QDATA_P\cos(\omega_D t+\theta_P) \quad\quad 8$$

Equation 7 and 8 can be rewritten using equations 5 and 6 as:

$$RIDATA_P = \tfrac{1}{2} IDATA_P \cdot EQ1_P - \tfrac{1}{2} QDATA_P \cdot EQ2_P \quad\quad 9$$

$$RQDATA_P = \tfrac{1}{2} IDATA_P \cdot EQ2_P + \tfrac{1}{2} QDATA_P \cdot EQ1_P \quad\quad 10$$

Using equations 5, 6, 9, 10 and algebra of matrices, it can be shown that:

$$(\alpha_P)^2 IDATA_P = 2 \cdot (RIDATA_P \cdot EQ1_P + RQDATA_P \cdot EQ2_P) \quad\quad 11$$

$$(\alpha_P)^2 QDATA_P = 2 \cdot (-RIDATA_P \cdot EQ2_P + RQDATA_P \cdot EQ1_P) \quad\quad 12$$

The received symbols, IDATA and QDATA are calculated to be:

$$IDATA = (\alpha_{L2})^2 IDATA_{L2}+(\alpha_{L1})^2 IDATA_{L1}+(\alpha_P)^2 IDATA_P+(\alpha_{E1})^2 IDATA_{E1}+(\alpha_{E2})^2 IDATA_{E2} \quad\quad 13$$

$$QDATA = (\alpha_{L2})^2 QDATA_{L2}+(\alpha_{L1})^2 QDATA_{L1}+(\alpha_P)^2 QDATA_P+(\alpha_{E1})^2 QDATA_{E1}+(\alpha_{E2})^2 QDATA_{E2} \quad\quad 14$$

The signaling data demodulation is carried out in a similar manner.

The initial acquisition of the chip-sequence signal embedded in the received QPSK-spread-spectrum signal is non-coherent and is based on the data signal. Since there are five complex taps, i.e., for receiving five rays or paths of a multipath signal, the acquisition time is five times faster than acquisition that is based on a single tap. The acquisition is based on a well known and published double threshold algorithm.

Figure 7:
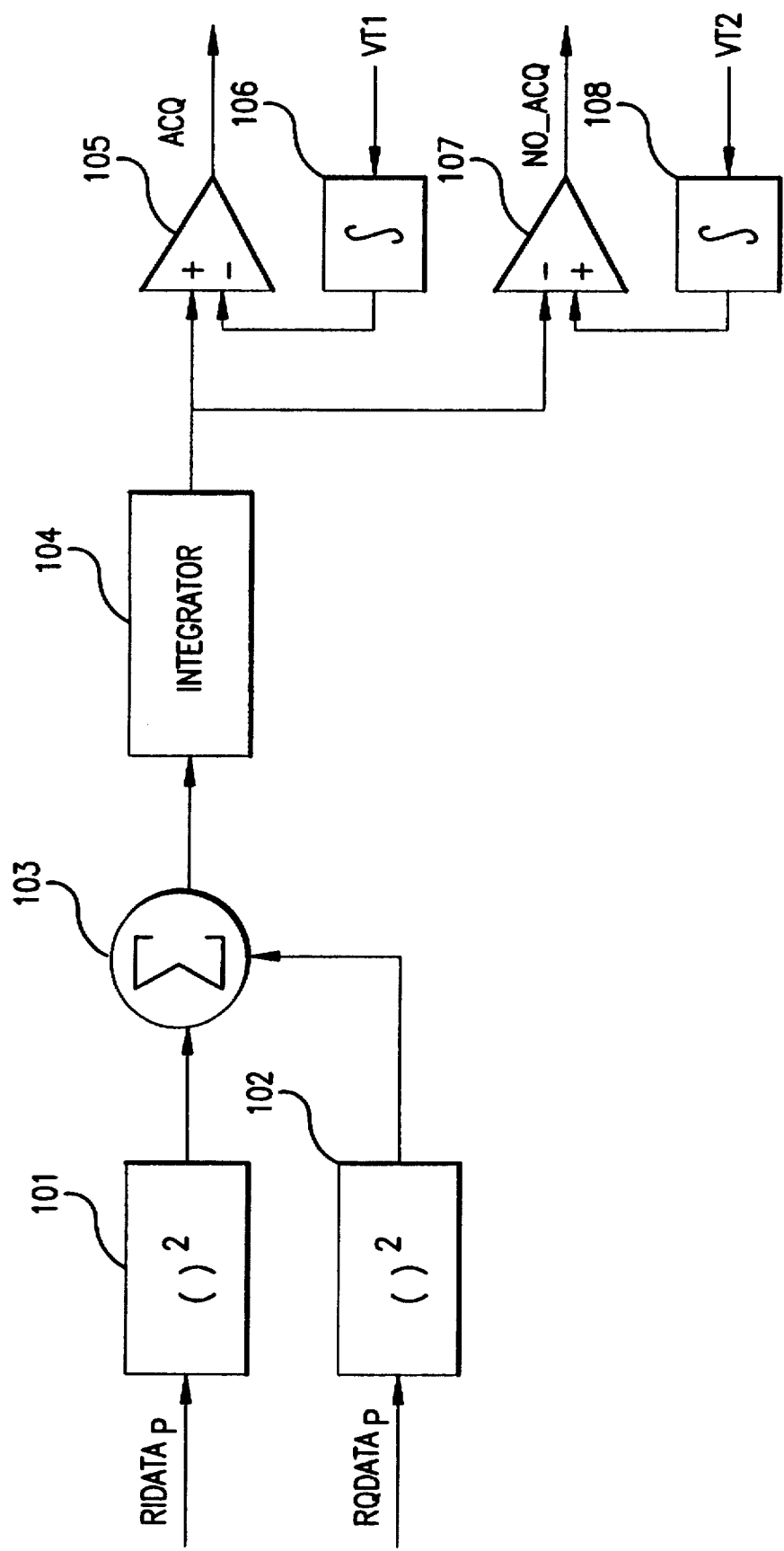
FIG. 7 is a block diagram of an acquisition circuit.

As shown in FIG. 7, the sum of the squares, (RIDATA$_P$)$^2$+(RQDATA$_P$)$^2$, is formed by the squaring function or devices 101, 102 and summer 103. The sum signal is integrated by integrator 104 and compared by comparators 105, 107 to two time integrated thresholds, $VT_1$ and $VT_2$, set by two threshold devices 106, 108. When the output of the integrator 104 is more positive than ($VT_1 \cdot t$) acquisition is declared. When the output of the integrator 104 is less than ($VT_2 \cdot t$) dismission is declared, and the chip-sequence signal phase is advanced by ½ chip. When acquisition is achieved, the acquisition mode is abandoned and the system enters a tracking mode. The thresholds, in a preferred embodiment, are chosen to achieve a constant false alarm rate of $10^{-3}$. This method of acquisition is also known as serial search, where consecutive phases of the chip-sequence signal embedded in the received QPSK-spread-spectrum signal are checked serially to determine acquisition.

Figure 8:
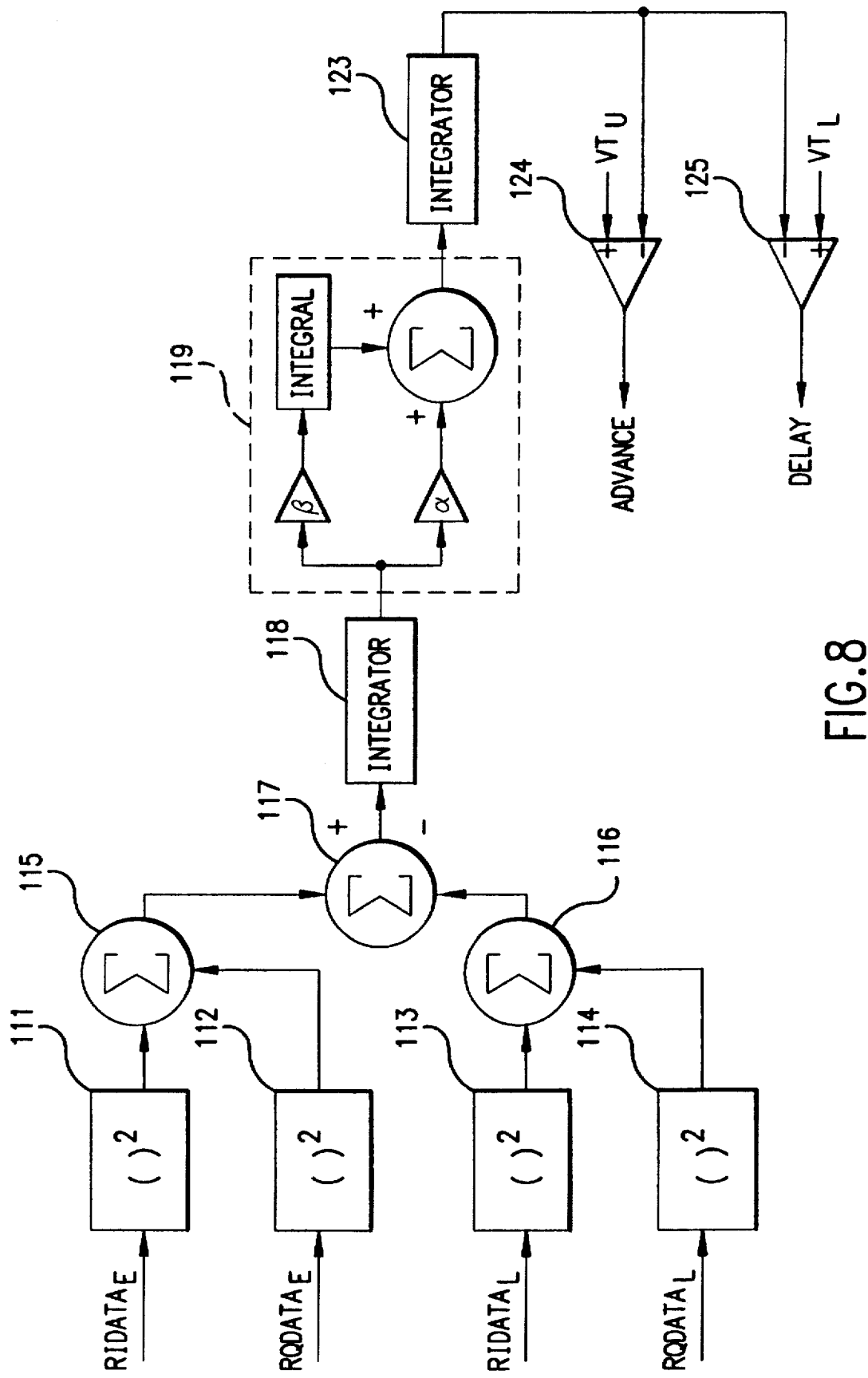
FIG. 8 is a block diagram of an early-late tracking circuit.

As shown in FIG. 8, the energy in the late signal ; $(RIDATA_L)^2 + (RQDATA_L)^2$, from squaring devices 113, 114 and adder 16, is subtracted by adder 117 from the energy in the early signal, $(RIDATA_E)^2 + (RQDATA_E)^2$ from squaring devices 111, 112 and adder 116. The difference is integrated by integrator 118 and filtered by, a proportional constant $\alpha$, plus $\beta$ times integral, proportional plus integral filter 119. The output of the filter 119 is integrated by integrator 123 and compared by comparator 124 to an upper threshold $VT_U$, and comparator 125 to a lower threshold $VT_L$. When the upper threshold $VT_U$ is exceeded, there is more energy in the early signal and the phase of the reference chip-sequence signal is advanced, and when the lower threshold is reached, there is more energy in the late signal and the phase of the reference chip-sequence signal is delayed. This method of tracking is based on the well-known Early-minus-Late algorithm.

It will be apparent to those skilled in the art that various modifications can be made to the wideband code-division-multiple access system of the instant invention without departing from the scope or spirit of the invention, and it is intended that the present invention cover modifications and variations of the wideband code-division-multiple access system provided they come within the scope of the appended claims and their equivalents.

I claim:

1. An improvement to a wideband code-division-multiple-access (W-CDMA) system, comprising:

a W-CDMA transmitter, said W-CDMA transmitter including, an in-phase-data-product device for multiplying an in-phase-data (IDATA) signal with a data-chip-sequence signal, thereby generating an IDATA-spread-spectrum signal;

a quadrature-phase-data-product device for multiplying a quadrature-phase-data (QDATA) signal with the data-chip-sequence signal, thereby generating a QDATA-spread-spectrum signal;

equalization-chip means for outputting an equalization-chip-sequence signal;

an in-phase combiner, coupled to said in-phase-data-product device and to said equalization-chip means, for linearly combining the IDATA-spread-spectrum signal and the equalization-chip-sequence signal, to generate an in-phase-combined-spread-spectrum signal;

a quadrature-phase combiner, coupled to said quadrature-phase-data-product device and to said equalization-chip means, for linearly combining the QDATA-spread-spectrum signal, and the equalization-chip-sequence signal, to generate the quadrature-phase-combined-spread-spectrum signal;

a quadrature-phase-shift-keyed (QPSK) modulator, coupled to said in-phase combiner and to said quadrature-phase combiner, for QPSK modulating the in-phase-combined-spread-spectrum signal with the quadrature-phase-combined-spread-spectrum signal, thereby generating a QPSK-spread-spectrum signal;

a power amplifier, coupled to said QPSK modulator, for amplifying the QPSK-spread-spectrum signal;

a transmitter antenna, coupled to said power amplifier, for radiating the amplified QPSK-spread-spectrum signal over a communications channel;

a W-CDMA receiver, said W-CDMA receiver including, a receiver antenna for coupling the W-CDMA receiver to the communications channel;

in-phase-punctual-equalization (IPE) means, coupled to said receiver antenna, for despreading an in-phase component of the equalization-chip-sequence signal embedded in the QPSK-spread-spectrum signal, as a received-in-phase-punctual-equalization signal ($RIEQ_P$);

first in-phase-late-equalization (ILE) means, coupled to said receiver antenna, for despreading, a first portion of a chip late, the in-phase component of the equalization-chip-sequence signal embedded in the QPSK-spread-spectrum signal, as a first received-in-phase-late-equalization signal ($RIEQ_{L1}$);

quadrature-phase-punctual-equalization (QPE) means, coupled to said receiver antenna, for despreading a quadrature-phase component of the equalization-chip-sequence signal embedded in the QPSK-spread-spectrum signal, as a received-quadrature-phase-punctual-equalization signal ($RQEQ_P$);

first quadrature-phase-late-equalization (QLE) means, coupled to said receiver antenna, for despreading, the first portion of the chip late, the quadrature-phase component of the equalization-chip-sequence signal embedded in the QPSK-spread-spectrum signal, as a first received-quadrature-phase-late-equalization signal ($RQEQ_{L1}$);

in-phase-punctual-data (IPD) means, coupled to said receiver antenna, for despreading the IDATA-spread-spectrum signal embedded in the QPSK-spread-spectrum signal as a received-in-phase-punctual-data signal ($RIDATA_P$);

first in-phase-late-data (ILD) means, coupled to said receiver antenna, for despreading, the first portion of the chip late, the IDATA-spread-spectrum signal embedded in the QPSK-spread-spectrum signal, as a first received-in-phase-late-data signal ($RIDATA_{L1}$);

quadrature-phase-punctual-data (QPD) means, coupled to said receiver antenna, for despreading the QDATA-spread-spectrum signal embedded in the QPSK-spread-spectrum signal as a received-quadrature-phase-punctual-data signal ($RQDATA_P$);

first quadrature-phase-late-data (QLD) means, coupled to said receiver antenna, for despreading, the first portion of the chip late, the QDATA-spread-spectrum signal embedded in the QPSK-spread-spectrum signal, as a first received-quadrature-phase-late-data signal ($RQDATA_{L1}$); and a processor for determining a first punctual-equalization signal ($EQ1_P$) from the received-in-phase-punctual-equalization signal ($RIEQ_P$) plus the received-quadrature-phase-punctual-equalization signal ($RQEQ_P$), for determining a second punctual-equalization signal ($EQ2_P$) from the receivedquadrature-phase-punctual-equalization signal
($RQEQ_P$) minus the received-in-phase-punctual-
equalization signal ($RIEQ_P$), for determining a first
late-equalization signal ($EQ1_L$) from the first
received-in-phase-late-equalization signal ($RIEQ_{L1}$)
plus the first received-quadrature-phase-late-
equalization signal ($RQEQ_{L1}$), for determining a
second late-equalization signal ($EQ2_L$) from the first
received-quadrature-phase-late-equalization signal
($RQEQ_{L1}$) minus the first received-in-phase-late-
equalization signal ($RIEQ_{L1}$), for determining an
in-phase-punctual-data signal ($IDATA_P$) from the
received-in-phase-punctual-data signal ($RIDATA_P$)
times the first punctual-equalization signal ($EQ1_P$),
plus the received-quadrature-phase-punctual-data
signal ($RQDATA_P$) times the second punctual-
equalization signal ($EQ2_P$), for determining a
quadrature-phase-punctual-data signal ($QDATA_P$)
from the received-quadrature-phase-punctual-data
signal ($RQDATA_P$) times the first punctual-
equalization signal ($EQ1_P$), minus the received-in-
phase-punctual-data signal ($RIDATA_P$) times the
second punctual-equalization signal ($EQ2_P$), for
determining a first in-phase-late-data signal
($IDATA_{L1}$) from the first received-in-phase-late-data
signal ($RIDATA_{L1}$) times the first late-equalization
signal ($EQ1_L$), plus the first received-quadrature-
phase-late-data signal ($RQDATA_{L1}$) times the sec-
ond late-equalization signal ($EQ2_L$), for determining
a first quadrature-phase-late-data signal ($QDATA_{L1}$)
from the first received-quadrature-phase-late-data
signal ($RQDATA_{L1}$) times the first late-equalization
signal ($EQ1_L$), minus the first received-in-phase-
late-data signal ($RIDATA_{L1}$) times the second late-
equalization signal ($EQ2_L$), for determining an
output-in-phase-data signal ($IDATA_O$) from
$IDATA_O=IDATA_{L1}+IDATA_P$ and for, determining
an output-quadrature-phase-data signal ($QDATA_O$)
from $QDATA_O=QDATA_{L1}+QDATA_P$.

2. The W-CDMA system as set forth in claim 1, further
comprising:

second ILE means, coupled to said receiver antenna, for
despreading, a second portion of a chip late, the
in-phase component of the equalization-chip-sequence
signal embedded in the QPSK-spread-spectrum signal,
as a second received-in-phase-late-equalization signal
($RIEQ_{L2}$);

second QLE means, coupled to said receiver antenna, for
despreading, the second portion of the chip late, the
quadrature-phase component of the equalization-chip-
sequence signal embedded in the QPSK-spread-
spectrum signal, as a second received-quadrature-
phase-late-equalization signal ($RQEQ_{L2}$);

second ILD means, coupled to said receiver antenna, for
despreading, the second portion of the chip late, the
IDATA-spread-spectrum signal embedded in the
QPSK-spread-spectrum signal, as a second received-
in-phase-late-data signal ($RIDATA_{L2}$);

second QLD means, coupled to said receiver antenna, for
despreading, the second portion of the chip late, the
QDATA-spread-spectrum signal embedded in the
QPSK-spread-spectrum signal, as a second received-
quadrature-phase-late-data signal ($RQDATA_{L2}$); and said processor for determining a third late-equalization
signal ($EQ3_L$) from the second received-in-phase-late-
equalization signal ($RIEQ_{L2}$) plus the second received-
quadrature-phase-late-equalization signal ($RQEQ_{L2}$),
for determining a fourth late-equalization signal
($EQ4_L$) from the second received-quadrature-phase-
late-equalization signal ($RQEQ_{L2}$) minus the second
received-in-phase-late-equalization signal ($RIEQ_{L2}$),
for determining a second in-phase-late-data signal
($IDATA_{L2}$) from the second received-in-phase-late-
data signal ($RIDATA_{L2}$) times the third late-
equalization signal ($EQ3_L$), plus the second received-
quadrature-phase-late-data signal ($RQDATA_{L2}$) times
the fourth late-equalization signal ($EQ4_L$), for deter-
mining a second quadrature-phase-late-data signal
($QDATA_{L2}$) from the second received-quadrature-
phase-late-data signal ($RQDATA_{L2}$) times the third
late-equalization signal ($EQ3_L$) minus the second
received-in-phase-late-data signal ($RIDATA_{L2}$) times
the fourth late-equalization signal ($EQ4_L$), for deter-
mining an output-in-phase-data signal ($IDATA_O$) from
$IDATA_O=IDATA_{L2}+IDATA_{L1}+IDATA_P$ and for, deter-
mining an output quadrature-phase-data signal
($QDATA_O$) from $QDATA_O=QDATA_{L2}+QDATA_{L1}+QDATA_P$.

3. The W-CDMA system as set forth in claim 2, further
comprising:

first in-phase-early-equalization (IEE) means, coupled to
said receiver antenna, for despreading, the first portion
of the chip early, the in-phase component of the
equalization-chip-sequence signal embedded in the
QPSK-spread-spectrum signal, as a first received-in-
phase-early-equalization signal ($RIEQ_{E1}$);

first quadrature-phase-early-equalization (QEE) means,
coupled to said receiver antenna, for despreading, the
first portion of the chip early, the quadrature-phase
component of the equalization-chip-sequence signal
embedded in the QPSK-spread-spectrum signal, as a
first received-quadrature-phase-early-equalization sig-
nal ($RQEQ_{E1}$);

first in-phase-early-data (IED) means, coupled to said
receiver antenna, for despreading, the first portion of
the chip early, the IDATA-spread-spectrum signal
embedded in the QPSK-spread-spectrum signal, as a
first received-in-phase-early-data signal ($RIDATA_{E1}$);

first quadrature-phase-early-data (QED) means, coupled
to said receiver antenna, for despreading, the first
portion of the chip early, the QDATA-spread-spectrum
signal embedded in the QPSK-spread-spectrum signal,
as a first received-quadrature-phase-early-data signal
($RQDATA_{E1}$); and processor for determining a first early-equalization signal
($EQ1_E$) from the first received-in-phase-early-
equalization signal ($RIEQ_{E1}$) plus the first received-
quadrature-phase-early equalization signal ($RQEQ_{E1}$),
for determining a second early-equalization signal
($EQ2_E$) from the first received-quadrature-phase-early-
equalization signal ($RQEQ_{E1}$) minus the first received-
in-phase-early-equalization signal ($RIEQ_{E1}$), for deter-
mining a first in-phase-early-data signal ($IDATA_{E1}$)
from the first received-in-phase-early-data signal
($RIDATA_{E1}$) times the first early-equalization signal
($EQ1_E$), plus the first received-quadrature-phase-early-
data signal ($RQDATA_{E1}$) times the second early-
equalization signal ($EQ2_E$), for determining a first
quadrature-phase-early-data signal ($QDATA_{E1}$) from
the first received-quadrature-phase-early-data signal
($RQDATA_{E1}$) times the first early-equalization signal
($EQ1_E$), minus the first received-in-phase-early-data signal (RIDATA$_{E1}$) times the second early-equalization signal (EQ2$_E$), for determining an output-in-phase-data signal (IDATA$_O$) from IDATA$_O$=IDATA$_{L1}$+IDATA$_{L2}$+IDATA$_P$+IDATA$_{E1}$ and for, determining an output quadrature-phase-data signal (QDATA$_O$) from QDATA$_O$=QDATA$_{L1}$+QDATA$_{L2}$+QDATA$_P$+QDATA$_{E1}$.

4. The W-CDMA system as set forth in claim 3, further comprising:

second IEE means, coupled to said receiver antenna, for despreading, the second portion of the chip early, the in-phase component of the equalization-chip-sequence signal embedded in the QPSK-spread-spectrum signal, as a second received-in-phase-early-equalization signal (RIEQ$_{E2}$);

second QEE means, coupled to said receiver antenna, for despreading, the second portion of the chip early, the quadrature-phase component of the equalization-chip-sequence signal embedded in the QPSK-spread-spectrum signal, as a second received-quadrature-phase-early-equalization signal (RQEQ$_{E2}$);

second IED means, coupled to said receiver antenna, for despreading, the second portion of the chip early, the IDATA-spread-spectrum signal embedded in the QPSK-spread-spectrum signal as a second received-in-phase-early-data signal (RIDATA$_{E2}$);

second QED means, coupled to said receiver antenna, for despreading, the second portion of the chip early, the QDATA-spread-spectrum signal embedded in the QPSK-spread-spectrum signal as a second received-quadrature-phase-early-data signal (RQDATA$_{E2}$); and processor for determining a third early-equalization signal (EQ3$_E$) from the second received-quadrature-phase-early-equalization signal (RQEQ$_{E2}$) plus the second received-in-phase-early-equalization signal (RIEQ$_{E2}$), for determining a fourth early-equalization signal (EQ4$_E$) from the second received-quadrature-phase-early-equalization signal (RQEQ$_{E2}$) minus the second received-in-phase-early-equalization signal (RIEQ$_{E2}$), for determining a second in-phase-early-data signal (IDATA$_{E2}$) from the second received-in-phase-early-data signal (RIDATA$_{E2}$) times the third punctual-equalization signal (EQ3$_P$), plus the second received-quadrature-phase-early-data signal (RQDATA$_{E2}$) times the fourth early-equalization signal (EQ4$_E$), for determining a second quadrature-phase-early-data signal (QDATA$_{E2}$) from the second received-quadrature-phase-early-data signal (RQDATA$_{E2}$) times the third early-equalization signal (EQ3$_E$), minus the second received-in-phase-early-data signal (RIDATA$_{E2}$) times the fourth early-equalization signal (EQ4$_E$), for determining an output-in-phase-data signal (IDATA$_O$) from IDATA$_O$=IDATA$_{L2}$+IDATA$_{L1}$+IDATA$_P$+IDATA$_{E1}$+IDATAE$_{E2}$ and for, determining an output quadrature-phase-data signal (QDATA$_O$) from QDATA$_O$= QDATA$_{L2}$+QDATA$_{L1}$+QDATA$_P$+QDATA$_{E1}$+QDATA$_{E2}$.

5. A method using wideband code-division-multiple-access (W-CDMA) transmitter and a W-CDMA receiver, comprising the steps of:

multiplying, at said W-CDMA transmitter, an in-phase-data (IDATA) signal with a data-chip-sequence signal, thereby generating an IDATA-spread-spectrum signal;

multiplying, at said W-CDMA transmitter, a quadrature-phase-data (QDATA) signal with the data-chip-sequence signal, thereby generating a QDATA-spread-spectrum signal;

generating, at said W-CDMA transmitter, an equalization-chip-sequence signal;

combining, linearly, at said W-CDMA transmitter, the IDATA-spread-spectrum signal and the equalization-chip-sequence signal, to generate an in-phase-combined-spread-spectrum signal;

combining, linearly, at said W-CDMA transmitter, the QDATA-spread-spectrum signal, and the equalization-chip-sequence signal, to generate the quadrature-phase-combined-spread-spectrum signal;

QPSK modulating, at said W-CDMA transmitter, the in-phase-combined-spread-spectrum signal with the quadrature-phase-combined-spread-spectrum signal, thereby generating a QPSK-spread-spectrum signal;

radiating, at said W-CDMA transmitter, the amplified QPSK-spread-spectrum signal over a communications channel;

despreading, at said W-CDMA receiver, an in-phase component of the equalization-chip-sequence signal embedded in the QPSK-spread-spectrum signal, as a received-in-phase-punctual-equalization signal (RIEQ$_P$);

despreading, a first portion of a chip late, at said W-CDMA receiver, the in-phase component of the equalization-chip-sequence signal embedded in the QPSK-spread-spectrum signal, as a first received-in-phase-late-equalization signal (RIEQ$_{L1}$);

despreading, at said W-CDMA receiver, a quadrature-phase component of the equalization-chip-sequence signal embedded in the QPSK-spread-spectrum signal, as a received-quadrature-phase-punctual-equalization signal (RQEQ$_P$);

despreading, the first portion of the chip late, at said W-CDMA receiver, the quadrature-phase component of the equalization-chip-sequence signal embedded in the QPSK-spread-spectrum signal, as a first received-quadrature-phase-late-equalization signal (RQEQ$_{L1}$);

despreading, at said W-CDMA receiver, the IDATA-spread-spectrum signal embedded in the QPSK-spread-spectrum signal as a received-in-phase-punctual-data signal (RIDATA$_P$);

despreading, the first portion of the chip late, at said W-CDMA receiver, the IDATA-spread-spectrum signal embedded in the QPSK-spread-spectrum signal, as a first received-in-phase-late-data signal (RIDATA$_{L1}$);

despreading, at said W-CDMA receiver, the QDATA-spread-spectrum signal embedded in the QPSK-spread-spectrum signal as a received-quadrature-phase-punctual-data signal (RQDATA$_P$);

despreading, the first portion of the chip late, at said W-CDMA receiver, the QDATA-spread-spectrum signal embedded in the QPSK-spread-spectrum signal, as a first received-quadrature-phase-late-data signal (RQDATA$_{L1}$);

determining, at said W-CDMA receiver, a first punctual-equalization signal (EQ1$_P$) from the received-in-phase-punctual-equalization signal (RIEQ$_P$) plus the received-quadrature-phase-punctual-equalization signal (RQEQ$_P$);

determining, at said W-CDMA receiver, a second punctual-equalization signal (EQ2$_P$) from the received-quadrature-phase-punctual-equalization signal (RQEQ$_P$) minus the received-in-phase-punctual-equalization signal (RIEQ$_P$);

determining, at said W-CDMA receiver, a first late-equalization signal (EQ1$_L$) from the first received-inphase-late-equalization signal ($RIEQ_{L1}$) plus the first received-quadrature-phase-late-equalization signal ($RQEQ_{L1}$);

determining, at said W-CDMA receiver, a second late-equalization signal ($EQ2_L$) from the first received-quadrature-phase-late-equalization signal ($RQEQ_{L1}$) minus the first received-in-phase-late-equalization signal ($RIEQ_{L1}$);

determining, at said W-CDMA receiver, an in-phase-punctual-data signal ($IDATA_P$) from the received-in-phase-punctual-data signal ($RIDATA_P$) times the first punctual-equalization signal ($EQ1_P$), plus the received-quadrature-phase-punctual-data signal ($RQDATA_P$) times the second punctual-equalization signal ($EQ2_P$);

determining, at said W-CDMA receiver, a quadrature-phase-punctual-data signal ($QDATA_P$) from the received-quadrature-phase-punctual-data signal ($RQDATA_P$) times the first punctual-equalization signal ($EQ1_P$), minus the received-in-phase-punctual-data signal ($RIDATA_P$) times the second punctual-equalization signal ($EQ2_P$);

determining, at said W-CDMA receiver, a first in-phase-late-data signal ($IDATA_{L1}$) from the first received-in-phase-late-data signal ($RIDATA_{L1}$) times the first late-equalization signal ($EQ1_L$), plus the first received-quadrature-phase-late-data signal ($RQDATA_{L1}$) times the second late-equalization signal ($EQ2_L$);

determining, at said W-CDMA receiver, a first quadrature-phase-late-data signal ($QDATA_{L1}$) from the first received-quadrature-phase-late-data signal ($RQDATA_{L1}$) times the first late-equalization signal ($EQ1_L$), minus the first received-in-phase-late-data signal ($RIDATA_{L1}$) times the second late-equalization signal ($EQ2_L$);

determining, at said W-CDMA receiver, an output-in-phase-data signal ($IDATA_O$) from $IDATA_O=IDATA_{L1}+IDATA_P$; and determining, at said W-CDMA receiver, an output quadrature-phase-data signal ($QDATA_O$) from $QDATA_O=QDATA_{L1}+QDATA_P$.

6. The W-CDMA method as set forth in claim 5, further comprising the steps of:

despreading, at said W-CDMA receiver, the second portion of the chip late, the in-phase component of the equalization-chip-sequence signal embedded in the QPSK-spread-spectrum signal, as a second received-in-phase-late-equalization signal ($RIEQ_{L2}$);

despreading, at said W-CDMA receiver, the second portion of the chip late, the quadrature-phase component of the equalization-chip-sequence signal embedded in the QPSK-spread-spectrum signal, as a second received-quadrature-phase-late-equalization signal ($RQEQ_{L2}$);

despreading, the second portion of the chip late, at said W-CDMA receiver, the IDATA-spread-spectrum signal embedded in the QPSK-spread-spectrum signal, as a second received-in-phase-late-data signal ($RIDATA_{L2}$);

despreading, the second portion of the chip late, at said W-CDMA receiver, the QDATA-spread-spectrum signal embedded in the QPSK-spread-spectrum signal, as a second received-quadrature-phase-late-data signal ($RQDATA_{L2}$); and determining, at said W-CDMA receiver, a third late-equalization signal ($EQ3_P$) from the second received-in-phase-late-equalization signal ($RIEQ_{L2}$) plus the second received-quadrature-phase-late-equalization signal ($RQEQ_{L2}$);

determining, at said W-CDMA receiver, a fourth late-equalization signal ($EQ4_L$) from the second received-quadrature-phase-late-equalization signal ($RQEQ_{L2}$) minus the second received-in-phase-late-equalization signal ($RIEQ_{L2}$);

determining, at said W-CDMA receiver, a second in-phase-late-data signal ($IDATA_{L2}$) from the second received-in-phase-late-data signal ($RIDATA_{L2}$) times the third late-equalization signal ($EQ3_L$), plus the second received-quadrature-phase-late-data signal ($RQDATA_{L2}$) times the fourth late-equalization signal ($EQ4_L$);

determining, at said W-CDMA receiver, a second quadrature-phase-late-data signal ($QDATA_{L2}$) from the second received-quadrature-phase-late-data signal ($RQDATA_{L2}$) times the third late-equalization signal ($EQ3_L$) minus the second received-in-phase-late-data signal ($RIDATA_{L2}$) times the fourth late-equalization signal ($EQ4_L$);

determining, at said W-CDMA receiver, an output-in-phase-data signal ($IDATA_O$) from $IDATA_O=IDATA_{L2}+IDATA_{L1}+IDATA_P$; and determining, at said W-CDMA receiver, an output quadrature-phase-data signal ($QDATA_O$) from $QDATA_O=QDATA_{L2}+QDATA_{L1}+QDATA_P$.

7. The W-CDMA method as set forth in claim 6, further comprising the steps of:

despreading, the first portion of the chip early, at said W-CDMA receiver, the in-phase component of the equalization-chip-sequence signal embedded in the QPSK-spread-spectrum signal, as a first received-in-phase-early-equalization signal ($RIEQ_{E1}$);

despreading, the first portion of the chip early, at said W-CDMA receiver, the quadrature-phase component of the equalization-chip-sequence signal embedded in the QPSK-spread-spectrum signal, as a first received-quadrature-phase-early-equalization signal ($RQEQ_{E1}$);

despreading, the first portion of the chip early, at said W-CDMA receiver, the IDATA-spread-spectrum signal embedded in the QPSK-spread-spectrum signal, as a first received-in-phase-early-data signal ($RIDATA_{E1}$);

despreading, the first portion of the chip early, at said W-CDMA receiver, the QDATA-spread-spectrum signal embedded in the QPSK-spread-spectrum signal, as a first received-quadrature-phase-early-data signal ($RQDATA_{E1}$); and determining, at said W-CDMA receiver, a first early-equalization signal ($EQ1_E$) from the first received-in-phase-early-equalization signal ($RIEQ_{E1}$) plus the first received-quadrature-phase-early equalization signal ($RQEQ_{E1}$);

determining, at said W-CDMA receiver, a second early-equalization signal ($EQ2_E$) from the first received-quadrature-phase-early-equalization signal ($RQEQ_{E1}$) minus the first received-in-phase-early-equalization signal ($RIEQ_{E1}$);

determining, at said W-CDMA receiver, a first in-phase-early-data signal ($IDATA_{E1}$) from the first received-in-phase-early-data signal ($RIDATA_{E1}$) times the first early-equalization signal ($EQ1_E$), plus the first received-quadrature-phase-early-data signal ($RQDATA_{E1}$) times the second early-equalization signal ($EQ2_E$);

determining, at said W-CDMA receiver, a first quadrature-phase-early-data signal ($QDATA_{E1}$) from the first received-quadrature-phase-early-data signal ($RQDATA_{E1}$) times the first early-equalization signal ($EQ1_E$), minus the first received-in-phase-early-data signal ($RIDATA_{E1}$) times the second early-equalization signal ($EQ2_E$);

determining, at said W-CDMA receiver, an output-in-phase-data signal ($IDATA_O$) from $IDATA_O = IDATA_{L1} + IDATA_{L2} + IDATA_P + IDATA_{E1}$; and determining, at said W-CDMA receiver, an output quadrature-phase-data signal ($QDATA_O$) from $QDATA_O = QDATA_{L1} + QDATA_{L2} + QDATA_P + QDATA_{E1}$.

8. The W-CDMA method as set forth in claim 7, further comprising the steps of:

despreading, the second portion of the chip early, at said W-CDMA receiver, the in-phase component of the equalization-chip-sequence signal embedded in the QPSK-spread-spectrum signal, as a second received-in-phase-early-equalization signal ($RIEQ_{E2}$);

despreading, the second portion of the chip early, at said W-CDMA receiver, the quadrature-phase component of the equalization-chip-sequence signal embedded in the QPSK-spread-spectrum signal, as a second received-quadrature-phase-early-equalization signal ($RQEQ_{E2}$);

despreading, the second portion of the chip early, at said W-CDMA receiver, the IDATA-spread-spectrum signal embedded in the QPSK-spread-spectrum signal as a second received-in-phase-early-data signal ($RIDATA_{E2}$);

despreading, the second portion of the chip early, at said W-CDMA receiver, the QDATA-spread-spectrum signal embedded in the QPSK-spread-spectrum signal as a second received-quadrature-phase-early-data signal ($RQDATA_{E2}$); and determining, at said W-CDMA receiver, a third early-equalization signal ($EQ3_E$) from the second received-quadrature-phase-early-equalization signal ($RQEQ_{E2}$) plus the second received-in-phase-early-equalization signal ($RIEQ_{E2}$);

determining, at said W-CDMA receiver, a fourth early-equalization signal ($EQ4_E$) from the second received-quadrature-phase-early-equalization signal ($RQEQ_{E2}$) minus the second received-in-phase-early-equalization signal ($RIEQ_{E2}$);

determining, at said W-CDMA receiver, a second in-phase-early-data signal ($IDATA_{E2}$) from the second received-in-phase-early-data signal ($RIDATA_{E2}$) times the third punctual-equalization signal ($EQ3_P$), plus the second received-quadrature-phase-early-data signal ($RQDATA_{E2}$) times the fourth early-equalization signal ($EQ4_E$);

determining, at said W-CDMA receiver, a second quadrature-phase-early-data signal ($QDATA_{E2}$) from the second received-quadrature-phase-early-data signal ($RQDATA_{E2}$) times the third early-equalization signal ($EQ3_E$), minus the second received-in-phase-early-data signal ($RIDATA_{E2}$) times the fourth early-equalization signal ($EQ4_E$);

determining, at said W-CDMA receiver, an output-in-phase-data signal ($IDATA_O$) from $IDATA_O = IDATA_{L2} + IDATA_{L1} + IDATA_P + IDATA_{E1} + IDATA_{E2}$; and determining, at said W-CDMA receiver, an output quadrature-phase-data signal ($QDATA_O$) from $QDATA_O = QDATA_{L2} + QDATA_{L1} + QDATA_P + QDATA_{E1} + QDATA_{E2}$.

9. An improvement to a wideband code-division-multiple-access (W-CDMA) receiver for receiving a QPSK-spread-spectrum signal comprising an in-phase-combined-spread-spectrum signal and a quadrature-phase-combined-spread-spectrum signal, with the in-phase-combined-spread-spectrum signal including an equalization-chip-sequence signal combined with an in-phase-data signal spread-spectrum processed with a data-chip-sequence signal, and with the quadrature-phase-combined-spread-spectrum signal including an equalization-chip-sequence signal combined with a quadrature-phase-data signal spread-spectrum processed with the data-chip-sequence signal, the improvement comprising:

in-phase-punctual-equalization (IPE) means for despreading an in-phase component of the equalization-chip-sequence signal embedded in the QPSK-spread-spectrum signal, as a received-in-phase-punctual-equalization signal ($RIEQ_P$);

first in-phase-late-equalization (ILE) means for despreading, a first portion of a chip late, the in-phase component of the equalization-chip-sequence signal embedded in the QPSK-spread-spectrum signal, as a first received-in-phase-late-equalization signal ($RIEQ_{L1}$);

quadrature-phase-punctual-equalization (QPE) means for despreading a quadrature-phase component of the equalization-chip-sequence signal embedded in the QPSK-spread-spectrum signal, as a received-quadrature-phase-punctual-equalization signal ($RQEQ_P$);

first quadrature-phase-late-equalization (QLE) means for despreading, a first portion of the chip late, the quadrature-phase component of the equalization-chip-sequence signal embedded in the QPSK-spread-spectrum signal, as a first received-quadrature-phase-late-equalization signal ($RQEQ_{L1}$);

in-phase-punctual-data (IPD) means for despreading the IDATA-spread-spectrum signal embedded in the QPSK-spread-spectrum signal as a received-in-phase-punctual-data signal ($RIDATA_P$);

first in-phase-late-data (ILD) means for despreading, the first portion of the chip late, the IDATA-spread-spectrum signal embedded in the QPSK-spread-spectrum signal, as a first received-in-phase-late-data signal ($RIDATA_{L1}$);

quadrature-phase-punctual-data (QPD) means for despreading the QDATA-spread-spectrum signal embedded in the QPSK-spread-spectrum signal as a received-quadrature-phase-punctual-data signal ($RQDATA_P$);

first quadrature-phase-late-data (QLD) means for despreading, a first portion of the chip late, the QDATA-spread-spectrum signal embedded in the QPSK-spread-spectrum signal, as a first received-quadrature-phase-late-data signal ($RQDATA_{L1}$); and a processor, coupled to said IPE means, ILE means, QPE means, QLE means, IPD means, ILD means, QPD means, and QLD means, for determining a first punctual-equalization signal ($EQ1_P$) from the received-in-phase-punctual-equalization signal ($RIEQ_P$) plus the received-quadrature-phase-punctual-equalization signal ($RQEQ_P$), for determining a second punctual-equalization signal ($EQ2_P$) from the received-quadrature-phase-punctual-equalization signal (RQEQ$_P$) minus the received-in-phase-punctual-equalization signal (RIEQ$_P$), for determining a first late-equalization signal (EQ1$_L$) from the first received-in-phase-late-equalization signal (RIEQ$_{L1}$) plus the first received-quadrature-phase-late-equalization signal (RQEQ$_{L1}$), for determining a second late-equalization signal (EQ2$_L$) from the first received-quadrature-phase-late-equalization signal (RQEQ$_{L1}$) minus the first received-in-phase-late-equalization signal (RIEQ$_{L1}$), for determining an in-phase-punctual-data signal (IDATA$_P$) from the received-in-phase-punctual-data signal (RIDATA$_P$) times the first punctual-equalization signal (EQ1$_P$), plus the received-quadrature-phase-punctual-data signal (RQDATA$_P$) times the second punctual-equalization signal (EQ2$_P$), for determining a quadrature-phase-punctual-data signal (QDATA$_P$) from the received-quadrature-phase-punctual-data signal (RQDATA$_P$) times the first punctual-equalization signal (EQ1$_P$), minus the received-in-phase-punctual-data signal (RIDATA$_P$) times the second punctual-equalization signal (EQ2$_P$), for determining a first in-phase-late-data signal (IDATA$_{L1}$) from the first received-in-phase-late-data signal (RIDATA$_{L1}$) times the first late-equalization signal (EQ1$_L$), plus the first received-quadrature-phase-late-data signal (RQDATA$_{L1}$) times the second late-equalization signal (EQ2$_L$), for determining a first quadrature-phase-late-data signal (QDATA$_{L1}$) from the first received-quadrature-phase-late-data signal (RQDATA$_{L1}$) times the first late-equalization signal (EQ 1$_L$), minus the first received-in-phase-late-data signal (RIDATA$_{L1}$) times the second late-equalization signal (EQ2$_L$), for determining an output-in-phase-data signal (IDATA$_O$) from IDATA$_O$=IDATA$_{L1}$+IDATA$_P$ and for, determining an output-quadrature-phase-data signal (QDATA$_O$) from QDATA$_O$=QDATA$_{L1}$+QDATA$_P$.

10. The improvement to the W-CDMA receiver as set forth in claim 9, further comprising:

second ILE means for despreading, a second portion of a chip late, the in-phase component of the equalization-chip-sequence signal embedded in the QPSK-spread-spectrum signal, as a second received-in-phase-late-equalization signal (RIEQ$_{L2}$);

second QLE means for despreading, the second portion of the chip late, the quadrature-phase component of the equalization-chip-sequence signal embedded in the QPSK-spread-spectrum signal, as a second received-quadrature-phase-late-equalization signal (RQEQ$_{L2}$);

second ILD means for despreading, the second portion of the chip late, the IDATA-spread-spectrum signal embedded in the QPSK-spread-spectrum signal, as a second received-in-phase-late-data signal (RIDATA$_{L2}$);

second QLD means for despreading, the second portion of the chip late, the QDATA-spread-spectrum signal embedded in the QPSK-spread-spectrum signal, as a second received-quadrature-phase-late-data signal (RQDATA$_{L2}$); and said processor, coupled to said ILE means, QLE means, ILD means and QLD means, for determining a third late-equalization signal (EQ3$_L$) from the second received-in-phase-late-equalization signal (RIEQ$_{L2}$) plus the second received-quadrature-phase-late-equalization signal (RQEQ$_{L2}$), for determining a fourth late-equalization signal (EQ4$_L$) from the second received-quadrature-phase-late-equalization signal (RQEQ$_{L2}$) minus the second received-in-phase-late-equalization signal (RIEQ$_{L2}$), for determining a second in-phase-late-data signal (IDATA$_{L2}$) from the second received-in-phase-late-data signal (RIDATA$_{L2}$) times the third late-equalization signal (EQ3$_L$), plus the second received-quadrature-phase-late-data signal (RQDATA$_{L2}$) times the fourth late-equalization signal (EQ4$_L$), for determining a second quadrature-phase-late-data signal (QDATA$_{L2}$) from the second received-quadrature-phase-late-data signal (RQDATA$_{L2}$) times the third late-equalization signal (EQ3$_L$) minus the second received-in-phase-late-data signal (RIDATA$_{L2}$) times the fourth late-equalization signal (EQ4$_L$), for determining an output-in-phase-data signal (IDATA$_O$) from IDATA$_O$=IDATA$_{L2}$+IDATA$_{L1}$+IDATA$_P$ and for, determining an output quadrature-phase-data signal (QDATA$_O$) from QDATA$_O$=QDATA$_{L2}$+QDATA$_{L1}$+QDATA$_P$.

11. The improvement to the W-CDMA receiver as set forth in claim 10, further comprising:

first in-phase-early-equalization (IEE) means for despreading, the first portion of the chip early, the in-phase component of the equalization-chip-sequence signal embedded in the QPSK-spread-spectrum signal, as a first received-in-phase-early-equalization signal (RIEQ$_{E1}$);

first quadrature-phase-early-equalization (QEE) means for despreading, the first portion of the chip early, the quadrature-phase component of the equalization-chip-sequence signal embedded in the QPSK-spread-spectrum signal, as a first received-quadrature-phase-early-equalization signal (RQEQ$_{E1}$);

first in-phase-early-data (IED) means for despreading, the first portion of the chip early, the IDATA-spread-spectrum signal embedded in the QPSK-spread-spectrum signal, as a first received-in-phase-early-data signal (RIDATA$_{E1}$);

first quadrature-phase-early-data (QED) means for despreading, the first portion of the chip early, the QDATA-spread-spectrum signal embedded in the QPSK-spread-spectrum signal, as a first received-quadrature-phase-early-data signal (RQDATA$_{E1}$); and said processor, coupled to said IEE means, QEE means, IED means and QED means, for determining a first early-equalization signal (EQ1$_E$) from the first received-in-phase-early-equalization signal (RIEQ$_{E1}$) plus the first received-quadrature-phase-early equalization signal (RQEQ$_{E1}$), for determining a second early-equalization signal (EQ2$_E$) from the first received-quadrature-phase-early-equalization signal (RQEQ$_{E1}$) minus the first received-in-phase-early-equalization signal (RIEQ$_{E1}$), for determining a first in-phase-early-data signal (IDATA$_{E1}$) from the first received-in-phase-early-data signal (RIDATA$_{E1}$) times the first early-equalization signal (EQ1$_E$), plus the first received-quadrature-phase-early-data signal (RQDATAE$_1$) times the second early-equalization signal (EQ2$_E$), for determining a first quadrature-phase-early-data signal (QDATAE$_1$) from the first received-quadrature-phase-early-data signal (RQDATAE$_1$) times the first early-equalization signal (EQ1$_E$), minus the first received-in-phase-early-data signal (RIDATA$_{E1}$) times the second early-equalization signal (EQ2$_E$), for determining an output-in-phase-data signal (IDATA$_O$) from IDATA$_O$=IDATA$_{L1}$+IDATA$_{L2}$+IDATA$_P$+IDATA$_{E1}$ and for, determining an output quadrature-phase-data signal (QDATA$_O$) from QDATA$_O$=QDATA$_{L1}$+QDATA$_{L2}$+QDATA$_P$+QDATA$_{E1}$.

12. The improvement to the W-CDMA receiver as set forth in claim 11, further comprising:

second IEE means for despreading the second portion of the chip early, the in-phase component of the equalization-chip-sequence signal embedded in the QPSK-spread-spectrum signal, as a second received-in-phase-early-equalization signal ($RIEQ_{E2}$);

second QEE means for despreading, the second portion of the chip early, the quadrature-phase component of the equalization-chip-sequence signal embedded in the QPSK-spread-spectrum signal, as a second received-quadrature-phase-early-equalization signal ($RQEQ_{E2}$);

second IED means for despreading, the second portion of the chip early, the IDATA-spread-spectrum signal embedded in the QPSK-spread-spectrum signal as a second received-in-phase-early-data signal ($RIDATA_{E2}$);

second QED means for despreading, the second portion of the chip early, the QDATA-spread-spectrum signal embedded in the QPSK-spread-spectrum signal as a second received-quadrature-phase-early-data signal ($RQDATA_{E2}$); and said processor, coupled to said second IEE means, second QEE means, second IED means and second QED means, for determining a third early-equalization signal ($EQ3_E$) from the second received-quadrature-phase-early-equalization signal ($RQEQ_{E2}$) plus the second received-in-phase-early-equalization signal ($RIEQ_{E2}$), for determining a fourth early-equalization signal ($EQ4_E$) from the second received-quadrature-phase-early-equalization signal ($RQEQ_{E2}$) minus the second received-in-phase-early-equalization signal ($RIEQ_{E2}$), for determining a second in-phase-early-data signal ($IDATA_{E2}$) from the second received-in-phase-early-data signal ($RIDATA_{E2}$) times the third punctual-equalization signal ($EQ3_P$), plus the second received-quadrature-phase-early-data signal ($RQDATA_{E2}$) times the fourth early-equalization signal ($EQ4_E$), for determining a second quadrature-phase-early-data signal ($QDATA_{E2}$) from the second received-quadrature-phase-early-data signal ($RQDATA_{E2}$) times the third early-equalization signal ($EQ3_E$), minus the second received-in-phase-early-data signal ($RIDATA_{E2}$) times the fourth early-equalization signal ($EQ4_E$), for determining an output-in-phase-data signal ($IDATA_O$) from $IDATA_O = IDATA_{L2} + IDATA_{L1} + IDATA_P + IDATA_{E1} + IDATA_{E2}$ and for, determining an output quadrature-phase-data signal ($QDATA_O$) from $QDATA_O = QDATA_{L2} + QDATA_{L1} + QDATA_P + QDATA_{E1} + QDATAE_2$.

13. A method for improving a wideband code-division-multiple-access (W-CDMA) receiver for receiving a QPSK-spread-spectrum signal comprising an in-phase-combined-spread-spectrum signal and a quadrature-phase-combined-spread-spectrum signal, with the in-phase-combined-spread-spectrum signal including an equalization-chip-sequence signal combined with an in-phase-data signal spread-spectrum processed with a data-chip-sequence signal, and with the quadrature-phase-combined-spread-spectrum signal including an equalization-chip-sequence signal combined with a quadrature-phase-data signal spread-spectrum processed with the data-chip-sequence signal, comprising the steps of:

despreading, at said W-CDMA receiver, an in-phase component of the equalization-chip-sequence signal embedded in the QPSK-spread-spectrum signal, as a received-in-phase-punctual-equalization signal ($RIEQ_P$);

despreading, a first portion of a chip late, at said W-CDMA receiver, the in-phase component of the equalization-chip-sequence signal embedded in the QPSK-spread-spectrum signal, as a first received-in-phase-late-equalization signal ($RIEQ_{L1}$);

despreading, at said W-CDMA receiver, a quadrature-phase component of the equalization-chip-sequence signal embedded in the QPSK-spread-spectrum signal, as a received-quadrature-phase-punctual-equalization signal ($RQEQ_P$);

despreading, the first portion of the chip late, at said W-CDMA receiver, the quadrature-phase component of the equalization-chip-sequence signal embedded in the QPSK-spread-spectrum signal, as a first received-quadrature-phase-late-equalization signal ($RQEQ_{L1}$);

despreading, at said W-CDMA receiver, the IDATA-spread-spectrum signal embedded in the QPSK-spread-spectrum signal as a received-in-phase-punctual-data signal ($RIDATA_P$);

despreading, the first portion of the chip late, at said W-CDMA receiver, the IDATA-spread-spectrum signal embedded in the QPSK-spread-spectrum signal, as a first received-in-phase-late-data signal ($RIDATA_{L1}$);

despreading, at said W-CDMA receiver, the QDATA-spread-spectrum signal embedded in the QPSK-spread-spectrum signal as a received-quadrature-phase-punctual-data signal ($RQDATA_P$);

despreading, the first portion of the chip late, at said W-CDMA receiver, the QDATA-spread-spectrum signal embedded in the QPSK-spread-spectrum signal, as a first received-quadrature-phase-late-data signal ($RQDATA_{L1}$);

determining, at said W-CDMA receiver, a first punctual-equalization signal ($EQ1_P$) from the received-in-phase-punctual-equalization signal ($RIEQ_P$) plus the received-quadrature-phase-punctual-equalization signal ($RQEQ_P$);

determining, at said W-CDMA receiver, a second punctual-equalization signal ($EQ2_P$) from the received-quadrature-phase-punctual-equalization signal ($RQEQ_P$) minus the received-in-phase-punctual-equalization signal ($RIEQ_P$);

determining, at said W-CDMA receiver, a first late-equalization signal ($EQ1_L$) from the first received-in-phase-late-equalization signal ($RIEQ_{L1}$) plus the first received-quadrature-phase-late-equalization signal ($RQEQ_{L1}$);

determining, at said W-CDMA receiver, a second late-equalization signal ($EQ2_L$) from the first received-quadrature-phase-late-equalization signal ($RQEQ_{L1}$) minus the first received-in-phase-late-equalization signal ($RIEQ_{L1}$);

determining, at said W-CDMA receiver, an in-phase-punctual-data signal ($IDATA_P$) from the received-in-phase-punctual-data signal ($RIDATA_P$) times the first punctual-equalization signal ($EQ1_P$), plus the received-quadrature-phase-punctual-data signal ($RQDATA_P$) times the second punctual-equalization signal ($EQ2_P$);

determining, at said W-CDMA receiver, a quadrature-phase-punctual-data signal ($QDATA_P$) from the received-quadrature-phase-punctual-data signal ($RQDATA_P$) times the first punctual-equalization signal ($EQ1_P$), minus the received-in-phase-punctual-data signal ($RIDATA_P$) times the second punctual-equalization signal ($EQ2_P$);

determining, at said W-CDMA receiver, a first in-phase-late-data signal ($IDATA_{L1}$) from the first received-in-phase-late-data signal ($RIDATA_{L1}$) times the first late-equalization signal ($EQ\ 1_L$), plus the first received-quadrature-phase-late-data signal ($RQDATA_{L1}$) times the second late-equalization signal ($EQ2_L$);

determining, at said W-CDMA receiver, a first quadrature-phase-late-data signal ($QDATA_{L1}$) from the first received-quadrature-phase-late-data signal ($RQDATA_{L1}$) times the first late-equalization signal ($EQ\ 1_L$), minus the first received-in-phase-late-data signal ($RIDATA_{L1}$) times the second late-equalization signal ($EQ2_L$);

determining, at said W-CDMA receiver, an output-in-phase-data signal ($IDATA_O$) from $IDATA_O=IDATA_{L1}+IDATA_P$; and determining, at said W-CDMA receiver, an output quadrature-phase-data signal ($QDATA_O$) from $QDATA_O=QDATA_{L1}+QDATA_P$.

14. The W-CDMA method as set forth in claim 13, further comprising the steps of:

despreading, at said W-CDMA receiver, the second portion of the chip late, the in-phase component of the equalization-chip-sequence signal embedded in the QPSK-spread-spectrum signal, as a second received-in-phase-late-equalization signal ($RIEQ_{L2}$);

despreading, at said W-CDMA receiver, the second portion of the chip late, the quadrature-phase component of the equalization-chip-sequence signal embedded in the QPSK-spread-spectrum signal, as a second received-quadrature-phase-late-equalization signal ($RQEQ_{L2}$);

despreading, the second portion of the chip late, at said W-CDMA receiver, the IDATA-spread-spectrum signal embedded in the QPSK-spread-spectrum signal, as a second received-in-phase-late-data signal ($RIDATA_{L2}$);

despreading, the second portion of the chip late, at said W-CDMA receiver, the QDATA-spread-spectrum signal embedded in the QPSK-spread-spectrum signal, as a second received-quadrature-phase-late-data signal ($RQDATA_{L2}$); and determining, at said W-CDMA receiver, a third late-equalization signal ($EQ3_P$) from the second received-in-phase-late-equalization signal ($RIEQ_{L2}$) plus the second received-quadrature-phase-late-equalization signal ($RQEQ_{L2}$);

determining at said W-CDMA receiver, a fourth late-equalization signal ($EQ4_L$) from the second received-quadrature-phase-late-equalization signal ($RQEQ_{L2}$) minus the second received-in-phase-late-equalization signal ($RIEQ_{L2}$);

determining, at said W-CDMA receiver, a second in-phase-late-data signal ($IDATA_{L2}$) from the second received-in-phase-late-data signal ($RIDATA_{L2}$) times the third late-equalization signal ($EQ3_L$), plus the second received-quadrature-phase-late-data signal ($RQDATA_{L2}$) times the fourth late-equalization signal ($EQ4_L$);

determining, at said W-CDMA receiver, a second quadrature-phase-late-data signal ($QDATA_{L2}$) from the second received-quadrature-phase-late-data signal ($RQDATA_{L2}$) times the third late-equalization signal ($EQ3_L$) minus the second received-in-phase-late-data signal ($RIDATA_{L2}$) times the fourth late-equalization signal ($EQ4_L$);

determining, at said W-CDMA receiver, an output-in-phase-data signal ($IDATA_O$) from $IDATA_O=IDATA_{L2}+IDATA_{L1}+IDATA_P$; and determining, at said W-CDMA receiver, an output quadrature-phase-data signal ($QDATA_O$) from $QDATA_O=QDATA_{L2}+QDATA_{L1}+QDATA_P$.

15. The W-CDMA method as set forth in claim 14, further comprising the steps of:

despreading, the first portion of the chip early, at said W-CDMA receiver, the in-phase component of the equalization-chip-sequence signal embedded in the QPSK-spread-spectrum signal, as a first received-in-phase-early-equalization signal ($RIEQ_{E1}$);

despreading, the first portion of the chip early, at said W-CDMA receiver, the quadrature-phase component of the equalization-chip-sequence signal embedded in the QPSK-spread-spectrum signal, as a first received-quadrature-phase-early-equalization signal ($RQEQ_{E1}$);

despreading, the first portion of the chip early, at said W-CDMA receiver, the IDATA-spread-spectrum signal embedded in the QPSK-spread-spectrum signal, as a first received-in-phase-early-data signal ($RIDATA_{E1}$);

despreading, the first portion of the chip early, at said W-CDMA receiver, the QDATA-spread-spectrum signal embedded in the QPSK-spread-spectrum signal, as a first received-quadrature-phase-early-data signal ($RQDATA_{E1}$); and determining, at said W-CDMA receiver, a first early-equalization signal ($EQ1_E$) from the first received-in-phase-early-equalization signal ($RIEQ_{E1}$) plus the first received-quadrature-phase-early equalization signal ($RQEQ_{E1}$);

determining, at said W-CDMA receiver, a second early-equalization signal ($EQ2_E$) from the first received-quadrature-phase-early-equalization signal ($RQEQ_{E1}$) minus the first received-in-phase-early-equalization signal ($RIEQ_{E1}$);

determining, at said W-CDMA receiver, a first in-phase-early-data signal ($IDATA_{E1}$) from the first received-in-phase-early-data signal ($RIDATA_{E1}$) times the first early-equalization signal ($EQ1_E$), plus the first received-quadrature-phase-early-data signal ($RQDATA_{E1}$) times the second early-equalization signal ($EQ2_E$);

determining, at said W-CDMA receiver, a first quadrature-phase-early-data signal ($QDATA_{E1}$) from the first received-quadrature-phase-early-data signal ($RQDATA_{E1}$) times the first early-equalization signal ($EQ1_E$), minus the first received-in-phase-early-data signal ($RIDATA_{E1}$) times the second early-equalization signal ($EQ2_E$);

determining, at said W-CDMA receiver, an output-in-phase-data signal ($IDATA_O$) from $IDATA_O=IDATA_{L1}+IDATA_{L2}+IDATA_P+IDATA_{E1}$; and determining, at said W-CDMA receiver, an output quadrature-phase-data signal ($QDATA_O$) from $QDATA_O=QDATA_{L1}+QDATA_{L2}+QDATA_P+QDATA_{E1}$.

16. The W-CDMA method as set forth in claim 15, further comprising the steps of:

despreading, the second portion of the chip early, at said W-CDMA receiver, the in-phase component of the equalization-chip-sequence signal embedded in the QPSK-spread-spectrum signal, as a second received-in-phase-early-equalization signal ($RIEQ_{E2}$);

despreading, the second portion of the chip early, at said W-CDMA receiver, the quadrature-phase component of the equalization-chip-sequence signal embedded in the QPSK-spread-spectrum signal, as a second received-quadrature-phase-early-equalization signal ($RQEQ_{E2}$);

despreading, the second portion of the chip early, at said W-CDMA receiver, the IDATA-spread-spectrum signal embedded in the QPSK-spread-spectrum signal as a second received-in-phase-early-data signal ($RIDATA_{E2}$);

despreading, the second portion of the chip early, at said W-CDMA receiver, the QDATA-spread-spectrum signal embedded in the QPSK-spread-spectrum signal as a second received-quadrature-phase-early-data signal ($RQDATA_{E2}$); and determining, at said W-CDMA receiver, a third early-equalization signal ($EQ3_E$) from the second received-quadrature-phase-early-equalization signal ($RQEQ_{E2}$) plus the second received-in-phase-early-equalization signal ($RIEQ_{E2}$);

determining, at said W-CDMA receiver, a fourth early-equalization signal ($EQ4_E$) from the second received-quadrature-phase-early-equalization signal ($RQEQ_{E2}$) minus the second received-in-phase-early-equalization signal ($RIEQ_{E2}$);

determining, at said W-CDMA receiver, a second in-phase-early-data signal ($IDATA_{E2}$) from the second received-in-phase-early-data signal ($RIDATA_{E2}$) times the third punctual-equalization signal ($EQ3_P$), plus the second received-quadrature-phase-early-data signal ($RQDATA_{E2}$) times the fourth early-equalization signal ($EQ4_E$);

determining, at said W-CDMA receiver, a second quadrature-phase-early-data signal ($QDATA_{E2}$) from the second received-quadrature-phase-early-data signal ($RQDATA_{E2}$) times the third early-equalization signal ($EQ3_E$), minus the second received-in-phase-early-data signal ($RIDATA_{E2}$) times the fourth early-equalization signal ($EQ4_E$);

determining, at said W-CDMA receiver, an output-in-phase-data signal ($IDATA_O$) from $IDATA_O = IDATA_{L2} + IDATA_{L1} + IDATA_P + IDATA_{E1} + IDATA_{E2}$; and determining, at said W-CDMA receiver, an output quadrature-phase-data signal ($QDATA_O$) from $QDATA_O = QDATA_{L2} + QDATA_{L1} + QDATA_P + QDATA_{E1} + QDATA_{E2}$.

* * * * *